United States Patent
Reuter et al.

(10) Patent No.: US 11,820,051 B2
(45) Date of Patent: Nov. 21, 2023

(54) AUTOMATED METHOD FOR INJECTION MOLDING COATED COMPONENTS

(71) Applicant: BASF Coatings GmbH, Münster (DE)

(72) Inventors: Karin Reuter, Muenster (DE); Lea Fedeler, Muenster (DE); Simon Winzen, Muenster (DE); Jens-Henning Noatschk, Muenster (DE)

(73) Assignee: BASF COATINGS GMBH, Muenster (DE)

( * ) Notice: Subject to any disclaimer, the term of this patent is extended or adjusted under 35 U.S.C. 154(b) by 272 days.

(21) Appl. No.: 17/296,108

(22) PCT Filed: Nov. 4, 2019

(86) PCT No.: PCT/EP2019/080098
§ 371 (c)(1),
(2) Date: May 21, 2021

(87) PCT Pub. No.: WO2020/104179
PCT Pub. Date: May 28, 2020

(65) Prior Publication Data
US 2022/0009133 A1    Jan. 13, 2022

(30) Foreign Application Priority Data
Nov. 23, 2018    (EP) .................... 18208031

(51) Int. Cl.
*B29C 45/14*    (2006.01)
*B29C 33/64*    (2006.01)
*B29D 35/00*    (2010.01)
*B29D 35/12*    (2010.01)
*C09D 5/00*    (2006.01)
*C09D 175/14*    (2006.01)

(52) U.S. Cl.
CPC ............. *B29C 33/64* (2013.01); *B29C 45/14* (2013.01); *B29D 35/0009* (2013.01); *B29D 35/122* (2013.01); *C09D 5/00* (2013.01); *C09D 175/14* (2013.01)

(58) Field of Classification Search
CPC ..................................................... B29C 45/14
See application file for complete search history.

(56) References Cited

U.S. PATENT DOCUMENTS

| | | | | |
|---|---|---|---|---|
| 4,714,738 A | * | 12/1987 | Chang | ........................ C08F 8/42 525/61 |
| 4,935,458 A | * | 6/1990 | Suzuki | ................ B29C 37/0032 536/99 |
| 6,737,468 B1 | | 5/2004 | Bremser | |

FOREIGN PATENT DOCUMENTS

| | | |
|---|---|---|
| DE | 19650076 C1 | 10/1997 |
| DE | 19738192 C1 | 12/1998 |
| DE | 19930665 A1 | 1/2001 |
| DE | 102010031376 A1 | 1/2012 |
| EP | 0325210 * | 7/1989 |
| EP | 1153052 A1 | 11/2001 |
| EP | 1153054 A1 | 11/2001 |
| EP | 1644428 A2 | 4/2006 |
| EP | 1981922 A1 | 10/2008 |
| EP | 2066712 A1 | 6/2009 |
| JP | H07329099 A | 12/1995 |
| WO | 2016028568 A1 | 2/2016 |

OTHER PUBLICATIONS

European Search Report for EP Patent Application No. 18208031.7, dated May 8, 2019, 3 pages.
International Search Report for corresponding PCT/EP2019/080098 dated Dec. 18, 2019, 2 Pages.

* cited by examiner

Primary Examiner — Edmund H Lee
(74) Attorney, Agent, or Firm — Armstrong Teasdale LLP

(57) ABSTRACT

Described herein is an automatic or automated process for injection molding of coated components, more particularly coated soles of plastic, where first of all the molding tool is lined with a release agent composition and, after flashing of this release agent composition, a composition for forming the component is injected. After crosslinking of these two compositions, the coated component produced is removed from the molding tool and subjected optionally to an after-treatment.

20 Claims, No Drawings

AUTOMATED METHOD FOR INJECTION MOLDING COATED COMPONENTS

CROSS-REFERENCE TO RELATED APPLICATIONS

This application is a U.S. National Phase Application of International Patent Application No. PCT/EP2019/080098, filed Nov. 4, 2019, which claims priority to European Patent Application No. 18208031.7, filed Nov. 23, 2018, the entire contents of which are hereby incorporated by reference herein.

FIELD OF INVENTION

The present invention relates to an automatic or automated process for injection molding of coated components, more particularly coated soles of plastic, wherein first of all the molding tool is lined with a release agent composition and, after flashing of this release agent composition, a composition for forming the component is injected. After crosslinking of these two compositions, the coated component produced is removed from the molding tool and subjected optionally to an aftertreatment.

BACKGROUND

A wide variety of different components, such as of footwear soles, with variable layer thicknesses are nowadays mostly produced by means of the injection molding method. In that method, the degree of automation is increasing sharply. An essential part of modern footwear manufacturing is the continued, indexed rotation of a rotary table about a station every 9 seconds. Each of the up to 64 stations consists of a last, over which an upper can be pulled, and a sole mold made of an aluminum alloy. The operation begins with the lining of the mold. A robot sprays an external release agent into the mold, in order to facilitate subsequent demolding. The rotary table moves 3-5 stations on, before the last with the upper closes the mold from above. Within these stations, for example, a TPU outsole can be inserted into the mold. This sole generally requires heat activation. As soon as this has been done, the foam is injected automatically. The mold remains closed for around 4 to 6 minutes until the foam is fully cured. During this time, the rotary table continues to move with indexing, allowing further molds to be filled. After a time referred to as the demolding time, the mold opens automatically and the last moves up. By means of this process, the sole is demolded and can be removed. There are further aftertreatment steps which follow, such as trimming, polishing, and also lacquering, for example. One way of endowing such components with enhanced protection is by coating. The coating must on the one hand have effective adhesion on the component, but on the other hand must be sufficiently flexible and elastic to allow the coated components to be employed even in areas involving high mechanical stressing.

The components are usually coated at present after they have been produced, in an overmolding process, for example, or by subsequent lacquering processes. Such processes, however, are inefficient, since they necessitate a further process step after production. Moreover, prior to further coating with a basecoat, for example, or to adhesive bonding to other components, it is necessary to remove the external release agent used when producing the components, and permitting demolding of the components from the molding tool without damage; such removal entails costly and inconvenient cleaning processes. Furthermore, the tools used must also be subjected to ongoing cleaning. Further disadvantages associated with the use of external mold release agents include a frequent lack of compatibility between release agent and the composition used for producing the component, and/or between release agent and molding tool, leading to adhesion problems. When external release agents are used, moreover, there is an increase in the cost and complexity of the process and hence in the operating times. Furthermore, the use of external release agents leads frequently to shiny surfaces on the components produced, this being unwanted especially in the footwear industry. Especially when using foams in order to produce components, furthermore, irregular surface structures, especially rough surface structures and also those in some cases having exposed fibers or pores, are obtained, and cannot be entirely eliminated either by using an external release agent or by means of subsequent coating with the layers of coating—in general, surfacer coats, basecoats, and clearcoats.

The coating of components during their production is known in the prior art and is also referred to as in-mold coating (IMC). Existing IMCs, however, have not been able to conform to the extremely short operating times in a highly indexed process, such as the rotary table process in the footwear industry, for example.

An advantage, accordingly, would be an automatic or automated process for producing coated components wherein coating takes place during the actual production of the component and wherein, moreover, there is no need for the use of external release agents. In that case the coating of the component must be able to be integrated without problems into the strictly indexed operation. However, despite the absence of external release agents, it ought to be possible to demold the coated components without damage. Furthermore, the coated components produced by this process ought not to have an irregular surface. Furthermore, with the manual process, it ought also to be possible to produce components of complex geometry without any defects occurring. Additionally, without costly and inconvenient cleaning and/or grinding steps, it ought to be possible to recoat the coated components produced, using commercial basecoat and clearcoat materials, and/or to bond them using adhesives.

Problem and Solution

A problem for the present invention to address, accordingly, was that of providing an automatic or automated process for injection molding of coated components, more particularly soles of plastic, which permits highly indexed, short operating times and also damage-free demolding and in which the coated components produced can be recoated without costly and inconvenient cleaning and/or grinding steps, using commercial basecoat and clearcoat materials, and/or can be bonded using adhesives. Furthermore, the surface of the coated components produced ought not to exhibit any irregularities. Moreover, both the mechanical properties and the resistance of the coated components produced toward environmental influences ought to be improved. The automatic or automated process ought also, furthermore, to allow the production of components of complex geometry without any defects occurring.

Solution to the Problem

It has been found that the stated problems have been solved by a new automatic process for injection molding of coated components, more particularly soles of plastic, comprising the following steps in the order indicated:
(A) application of a release agent composition to at least one inside of at least one molding part of a closable molding tool,
(B) flashing of the release agent composition applied in step (A),
(C) optional insertion of a first material M1, optional closing of the molding tool, and heating of the molding tool,
(D) injection of a composition Z1 into the closed molding tool and curing of the composition Z1,
(E) optional injection of at least one further composition Z2 into the closed molding tool and curing of the composition(s),
(F) opening of the molding tool,
(G) removal of the molded component, and
(H) optional aftertreatment of the molded component, where the release agent composition comprises:
(a) at least one solvent L,
(b) at least one compound of the general formula (I)

in which $R^1$ is a saturated or unsaturated, aliphatic hydrocarbon radical having 6 to 30 carbon atoms,
$R^2$ is H, a $PO(OH)_2$ radical, or the optionally partially phosphated radical of a monosaccharide or disaccharide, or the optionally partially phosphated radical of an alditol,
AO stands for one or more alkylene oxide radicals selected from the group consisting of ethylene oxide, propylene oxide and butylene oxide,
r is 0 or 1, and s is 0 to 30;
(c) optionally at least one polyether-modified alkylpolysiloxane,
(d) at least one polysiloxane of the general formula (II)

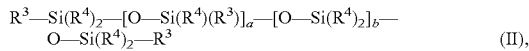

in which
$R^3$ and $R^4$, in each case independently of one another, are a methyl group or a $(HO-CH_2)_2-C(CH_2-CH_3)-CH_2-O-(CH_2)_3-*$ radical,
$R^5$ is a methyl group,
a is 0 or 1 to 10, and
b is 3 to 30; and
(e) optionally at least one binder B.

The above-stated process is also referred to below as the process of the invention and, accordingly, is the subject of the present invention. Preferred embodiments of the process of the invention are evident from the description hereinafter and also from the dependent claims.

Because of the short flashing and crosslinking times, the release agent used in the process of the invention not only allows short and highly indexed operating times but also leads to damage-free demolding of the coated components produced. This release agent, moreover, exhibits high adhesion to the component produced and permits aftercoating with commercial basecoat and clearcoat materials, and/or adhesive bonding, without costly and inconvenient cleaning and/or grinding steps. Even without aftercoating, the coating obtained on the component by the release agent is highly elastic or flexible and also UV-stable and exhibits a consistent degree of gloss or mattness, thus resulting not only in damage-free demolding of the coated component but also in effective protection of the coated component produced with respect to environmental influences, such as UV radiation, dirt or the like, as early as immediately after production, in other words without further treatment of the component. Moreover, the coated components produced have a regular surface even when produced using foams which, in combination with conventional release agents, lead to components having a highly irregular surface. Furthermore, it has also been possible to produce components having complex geometries, examples being footwear soles and also components with struts a few millimeters wide, without defects. Since only small residues of the release agent remain in the molding tool, the molding tools used do not have to be cleaned before every further application of the release agent.

DETAILED DESCRIPTION

Definitions:

First of all a number of terms used in the context of the present invention will be elucidated.

The process of the invention is an automatic or automated process. This means, in the context of the present invention, that the individual process steps are each tied to strict cycle times. Accordingly, there is no, or no substantial variation in the timespan needed in order to carry out each process step during multiple repetition of the process. This means, therefore, that in the case of dual repetition of the process, for example, the time which must be observed for process step (C) is always exactly the same for this process step. Automatic or automated processes within the meaning of the present invention therefore do not cover processes in which the individual process steps are not tied to strict cycle times, in other words where, on multiple repetition of the process, the timespan required for a process step is allowed to exhibit high variation.

However, the term "automated process" in the sense of the present invention does not mean that such processes cannot include manual process steps, an example being manual application of the release agent composition. The factor governing whether a process is or is not to be understood as automatic or automated process within the meaning of the present invention is therefore solely the process regime with a tie to strict cycle times per process step.

A component in accordance with the invention means an individual part which, joined with other components, forms an assembly. If, therefore, the component is part of a bodywork, of a motor vehicle, for example, it can be assembled with other bodywork components to form a bodywork. Where, for example, the component is a footwear sole, it can be assembled with other components of a footwear item to form such an item. In general, however, independently of the purpose of the material as being able to serve as a component, the invention relates generally to the production of coated components and is therefore not limited to components in the above sense. Consequently, where reference is made below to the coating of components, this also generally embraces the coating of materials without a "component" function; in other words, such materials need not necessarily be used as a component for producing assemblies.

A coated component in accordance with the invention means a component which has a coating on the surface. In accordance with the invention, the coating is applied to the surface of the component by crosslinking of the release agent composition during the production of said component. The coating of the component, accordingly, concerns the crosslinked release agent composition.

The term "inside" refers in accordance with the invention to the surface of a molding part of a molding tool that comes into contact with the release agent composition and also with the composition Z1 and, optionally, further materials and compositions used in the process, during the production of the component.

In process step (B) of the process of the invention, the applied release agent composition is flashed. This means, in accordance with the invention, the active or passive evaporation of solvents in the release agent, usually at a temperature which is higher than the ambient temperature and which is 40 to 90° C. for example. During flashing, therefore, solvents present in the applied release agent undergo evaporation. The release agent is able to run during flashing, because it is still fluid at any rate directly after application and at the start of flashing. This is because at least a release agent applied by spraying is generally applied in droplet form and not in uniform thickness. As a result of the solvents present, however, the release agent is fluid and is therefore able to run to form a uniform, smooth coating film. At the same time, solvents undergo successive evaporation, and so the coating layer resulting from the flashing phase is comparatively smooth and comprises less solvent than the applied release agent. The release agent layer after flashing, however, is not yet in the ready-to-use state. While it is indeed, for example, no longer fluid, it is still soft or tacky, and may have undergone only partial drying. In particular, the release agent layer is not yet crosslinked, as described later on below.

The term "poly(meth)acrylate" refers both to polyacrylates and to polymethacrylates.

Poly(meth)acrylates may therefore be composed of acrylates and/or methacrylates and may comprise further ethylenically unsaturated monomers such as styrene or acrylic acid, for example.

The term "aliphatic radical" refers herein to a radical of an acyclic or cyclic, saturated or unsaturated carbon compound, this radical containing no aromatic structures. Aliphatic radicals may accordingly, however, contain heteroatoms, such as oxygen or nitrogen, for example.

In process step (D) and optionally (E), the release agent composition, the composition Z1, and any further compositions are crosslinked. This refers to the curing of these compositions, in other words the conversion of these compositions into the ready-to-use state, meaning a state in which the component furnished with the release agent layer can be transported, stored, and used as intended. A crosslinked release agent layer and also a crosslinked component, therefore, in particular are no longer soft or tacky, having instead been conditioned to a solid release agent film or solid component, respectively. Even on further exposure to crosslinking conditions as described later on below, the film or component no longer exhibits any substantial change in its properties such as hardness or adhesion to the substrate.

As is known, release agent composition, and also the compositions (Z1, Z2, etc.) used in producing the component, may in principle be cured physically and/or chemically, depending on the components included, such as binders and crosslinking agents. The compositions are in particular cured chemically. Chemical curing comprehends thermochemical curing and actinic-chemical curing. The release agent and also the compositions (Z1, Z2, etc.), insofar as they are thermochemically curable, may be self-crosslinking and/or externally crosslinking. The term "self-crosslinking and/or externally crosslinking" in the context of the present invention means that the polymers included as binders and possibly crosslinking agents are able to crosslink with one another accordingly. The mechanisms involved and also the binders and crosslinking agents (film-forming components) that can be used are described later on below.

In the context of the present invention, "thermochemically curable" and, respectively, the term "thermochemical curing" refer to the crosslinking of the composition (formation of a cured composition) that is initiated by chemical reaction of reactive functional groups, with the possibility of energetic activation of this chemical reaction by means of thermal energy. Here, different functional groups, which are complementary to one another, may react with one another (complementary functional groups), and/or the formation of the cured composition is based on the reaction of autoreactive groups, these being functional groups which react with groups of their own kind. Examples of suitable complementary reactive functional groups and autoreactive functional groups are known from German patent application DE 199 30 665 A1, page 7, line 28 to page 9, line 24, for example.

This crosslinking may be self-crosslinking and/or external crosslinking. Where, for example, the complementary reactive functional groups are already present in an organic polymer used as binder, as for example in a polyester, a polyurethane or a poly(meth)acrylate, the crosslinking involved is self-crosslinking. External crosslinking is involved, for example, if a (first) organic polymer or a first compound containing particular functional groups, hydroxyl groups for example, reacts with a conventional crosslinking agent, as for example with a polyisocyanate and/or with a melamine resin. The crosslinking agent therefore contains reactive functional groups which are complementary to the reactive functional groups present in the (first) organic polymer used as binder.

In the case of external crosslinking in particular, the systems contemplated are the conventional multicomponent systems, especially two-component systems. In these systems, the components to be crosslinked, as for example the organic polymers as binders and the crosslinking agents, are present separately from one another in at least two components, which are not combined until shortly before the application. This form is selected when the components to be crosslinked react with one another effectively even at ambient temperatures or slightly elevated temperatures of 40 to 90° C., for example. A combination which may be stated by way of example is that of hydroxy-functional polyesters and/or polyurethanes and/or poly(meth)acrylates with free polyisocyanates as crosslinking agents.

It is also possible for an organic polymer as binder to have not only self-crosslinking but also externally crosslinking functional groups and to then be combined with crosslinking agents.

In the context of the present invention, "actinic-chemically curable" or the term "actinic-chemical curing" refers to the fact that curing is possible with application of actinic radiation, this being electromagnetic radiation such as near infrared (NIR) and UV radiation, especially UV radiation, and also particulate radiation such as electron beams. Curing by UV radiation is customarily initiated by radical or cationic photoinitiators. Typical actinically curable functional groups are carbon-carbon double bonds, in which case radical photoinitiators are generally employed. Actinic curing, then, is likewise based on chemical crosslinking.

In the curing of a composition labeled as being chemically curable, there will of course always be some physical curing, referring to the interlooping of polymer chains. The physical curing may even account for the major proportion. Nevertheless, a composition of this kind, if it comprises at least proportionally film-forming components that are chemically curable, is referred to as being chemically curable.

It follows from the above that, according to the nature of the coating composition and the components it comprises, curing is brought about by different mechanisms, which of course also necessitate different curing conditions—in particular, different curing temperatures and curing times.

In principle and in the context of the present invention it is the case that the curing of thermochemically curable two-component or three-component systems can be carried out at temperatures of, for example, 40 to 90° C., such as, in particular, 40 to 90° C., for a duration of 5 to 80 min, preferably 4 to 6 min. Accordingly it is the case that there is a pre-cure flashing phase at lower temperatures and/or for shorter times. A pre-cure flashing phase may run, for example, at 15 to 90° C. for a duration of, for example, 0.2 to 2 min, but in any case for shorter times and/or at lower temperatures than the subsequent curing.

All of the temperatures elucidated in the context of the present invention should be understood as the temperature of the molding tool in which the compositions are situated. It does not mean, therefore, that the compositions must themselves have the corresponding temperature.

The measurement methods to be employed in the context of the present invention for determining certain characteristic variables can be found in the Examples section. Unless explicitly indicated otherwise, these measurement methods are to be employed for determining the respective characteristic variable. Where reference is made in the context of the present invention to an official standard without any indication of the official period of validity, the reference is implicitly to that version of the standard that is valid on the filing date, or, in the absence of any valid version at that point in time, to the last valid version.

Process of the Invention:

Within the process of the invention, a coated component is produced by injection molding. This coated component in accordance with the invention is preferably a sole, more particularly footwear sole, made of plastic.

Process Step (A):

In step (A) of the process of the invention, a release agent composition is applied to at least one inside of a molding part of a closable molding tool. It is preferred in accordance with the invention if the release agent composition is applied to all insides of all molding parts of the closable molding tool. This ensures that the compositions (Z1, Z2, etc.) and materials M1 used for producing the coated component do not remain attached to the insides of the molding parts during removal, and that damage-free removal of the coated component is ensured. Through the damage-free removal of the coated component, moreover, there is no need for the molding tool to be cleaned after every production cycle.

It is preferred in accordance with the invention if the release agent composition is applied in process step (A) using application robots. The release agent composition used in the process of the invention is in this case applied exactly like release agent compositions known from the prior art. Furthermore, for applying the release agent composition used in accordance with the invention, it is also possible to use identical robots as for the application of release agent compositions known in the prior art, since with the process of the invention there is no need for additional application of further external release agents. The robots are programmed for the geometry of the sole molds and apply the release agent pneumatically and autonomously to the insides of the molding parts of the molding tool.

Where the release agent composition is applied by means of application robots, it is preferred in accordance with the invention if, during the application of the release agent composition with deployment of application robots, nozzles are used that have a diameter of 0.05 to 1.5 mm, preferably of 0.08 to 1 mm, more particularly of 0.1 to 0.8 mm. The use of nozzles having the afore-described diameters ensures that the insides of the molding parts of the molding tool are wetted completely with a sufficient amount of release agent composition, while at the same time preventing the application of too large a quantity of release agent composition.

The molding tool used in process step (A) may be at room temperature or may have already been heated to a certain temperature. This temperature, however, must not be so high that the applied release agent composition already undergoes crosslinking, since in that case the composition no longer adheres sufficiently to the composition Z1, Z2, etc. that is used for producing the component. Preferably in accordance with the invention, therefore, the molding tool in process step (A) has a temperature of 20 to 100° C., more preferably 30 to 90° C., very preferably 40 to 80° C., more particularly 50 to 70° C.

Release Agent Composition:

The composition of the invention preferably possesses a solids content of 30 to 60 wt %, more preferably of 35 to 55 wt %, very preferably of 40 to 50 wt %, more particularly of 42 to 48 wt %, based on the total weight of the composition. The solids content was determined according to ASTM D2369 (2015) at 110° C. for 60 min on a 2 gram sample of the composition.

It is preferred in accordance with the invention, furthermore, if the composition has a viscosity of 10 to 60 s, more particularly of 20 to 30 s (DIN4 flow cup), measured according to DIN EN ISO 2431 (March 2012). Establishing a low viscosity facilitates the application of the composition and therefore ensures sufficient wetting of the molding tool and also uniform coating of the component.

Release Agent Composition—Solvent L:

The release agent composition used in accordance with the invention may be a solvent-based composition or an aqueous composition. In the case of a solvent-based release agent composition, organic solvents are included as a principal constituent. Organic solvents constitute volatile constituents of the release agent composition, and undergo complete or partial vaporization on drying or flashing, respectively. The principal constituent of aqueous release agent compositions is water.

Preferably in accordance with the invention the at least one solvent L is selected from organic solvents, water, and mixtures thereof, and is present in a total amount of 40 to 70 wt %, more preferably 45 to 65 wt %, and very preferably 50 to 60 wt %, especially 52 to 58 wt %, based in each case on the total weight of the composition.

Organic solvents preferred in the context of the present invention are aprotic. With particular preference they are polar aprotic organic solvents. With very particular preference the organic solvents are chemically inert toward the remaining constituents of the composition.

Preferred organic solvents in the context of the present invention are, for example, ketones such as acetone, methyl ethyl ketone, cyclohexanone, methyl isobutyl ketone, methyl isoamyl ketone or diisobutyl ketone; esters such as ethyl acetate, n-butyl acetate, ethylene glycol diacetate, butyrolactone, diethyl carbonate, propylene carbonate, ethylene carbonate, 2-methoxypropyl acetate (MPA), and ethyl ethoxypropionate; amides such as N,N-dimethylformamide, N,N-dimethylacetamide, N-methylpyrrolidone, and N-ethylpyrrolidone; methylal, butylal, 1,3-dioxolane, glycerol formal; and, somewhat less preferably because they are nonpolar, hydrocarbons such as benzene, toluene, n-hexane, cyclohexane, and solvent naphtha. Especially preferred solvents belong to the class of the esters, among which n-butyl acetate and 1-methoxypropyl acetate are very especially preferred.

Release Agent Composition—Compound of the General Formula (I)

The release agent composition used in accordance with the invention further comprises a compound which may be rendered by the following formula (I):

$$R^1-(C=O)_r-O-(AO)_s-R^2 \qquad (I)$$

in which $R^1$ is a saturated or unsaturated, aliphatic hydrocarbon radical having 6 to 30 carbon atoms, preferably 8 to 26, more preferably 10 to 24, and very preferably 12 to 24 carbon atoms, $R^2$ is H, a $PO(OH)_2$ radical, or the optionally partially phosphated radical of a monosaccharide or disaccharide, or the optionally partially phosphated radical of an alditol, more particularly of sorbitol, AO stands for one or more alkylene oxide radicals selected from the group consisting of ethylene oxide, propylene oxide and butylene oxide, r is 0 or 1, and s is 0 to 30, preferably 1 to 25 or 2 to 25, more preferably 4 to 22 or 6 to 20, and very preferably 8 to 18.

The radical $R^1$ is preferably an acyclic radical.

The radicals AO may be identical or different and within the s radicals may have a random, blockwise or gradientlike arrangement. Where two or more different kinds of AO are included, it is preferred if the fraction of ethylene oxide is more than 50 mol %, more preferably at least 70 mol %, and very preferably at least 90 mol %, based on the total molar amount of the radicals AO. In the aforementioned cases the radicals different from ethylene oxide are preferably propylene oxide radicals.

Where r=0 and s>0, the species of the formula (I) are alkoxylated fatty alcohols, preferably ethoxylated fatty alcohols, which optionally are phosphated ($R^2=PO(OH)_2$) or etherified with a monosaccharide or disaccharide or with the radical of an alditol. Where r=1 and s>0, the species of the formula (I) are alkoxylated fatty acids, preferably ethoxylated fatty acids, which optionally are phosphated ($R^2=PO(OH)_2$) or etherified with a monosaccharide or disaccharide or with the radical of an alditol.

Where s=0 and $R^2$ is the radical of a monosaccharide or disaccharide or the radical of an alditol, then the species of formula (I) are fatty alcohol ethers of a monosaccharide or disaccharide or of an alditol (r=0) or are fatty acid esters of a monosaccharide or disaccharide or of an alditol (r=1).

With particular preference, for some or all the species of the formula (I), s is 2 to 25, better still 6 to 20, and ideally 8 to 18, and/or, for some or all the species of the formula (I), s is 0 and $R^2$ is an optionally partially phosphated radical of a monosaccharide or disaccharide or is an optionally partially phosphated radical of an alditol. With particular preference $R^1$ in this case is a saturated or unsaturated, aliphatic hydrocarbon radical having 10 to 24 carbon atoms.

In particular it is also possible to use mixtures of the species of the formula (I) in which s is 0 for at least one species while for at least one further species s is >0, preferably 1 to 25 or 2 to 25, more preferably 4 to 22 or 6 to 20, and very preferably 8 to 18.

With particular preference, in the general formula (I), $R^1$ is a saturated or unsaturated aliphatic hydrocarbon radical having 10 to 24 carbon atoms, $R^2$ is H, a $PO(OH)_2$ radical, or the optionally partially phosphated radical of a monosaccharide or disaccharide, or the optionally partially phosphated radical of an alditol, more particularly of sorbitol, AO stands for one or more alkylene oxide radicals selected from the group consisting of ethylene oxide and propylene oxide, r is 0 or 1, and s is 0 or 1 to 25.

With further particular preference, in the general formula (I), $R^1$ is a saturated or unsaturated aliphatic hydrocarbon radical having 10 to 24 carbon atoms, $R^2$ is H, a $PO(OH)_2$ radical, or the optionally partially phosphated radical of a monosaccharide or the optionally partially phosphated radical of an alditol, more particularly of sorbitol, AO stands for one or more alkylene oxide radicals selected from the group consisting of ethylene oxide and propylene oxide and the ethylene oxide fraction in the total molar amount of the radicals AO is at least 70 mol %, r=0 or 1, and s=0 or s=6 to 20.

Especially preferred are mixtures which comprise the aforesaid alkoxylated fatty alcohols with s>0 and/or the aforesaid alkoxylated fatty acids with s>0 and at least one further species selected from the group encompassing optionally phosphated or etherified fatty alcohols where r=s=0 and $R^2=H$, $PO(OH)_2$, a monosaccharide radical, disaccharide radical or alditol radical, and optionally phosphated or esterified fatty acids where r=1, s=0, and $R^2=H$, $PO(OH)_2$, monosaccharide radical, disaccharide radical or alditol radical.

The total weight of the compound of the general formula (I) is preferably 0.1 to 10 wt %, more preferably 0.5 to 5 wt %, more particularly 1.5 to 4 wt % based in each case on the total weight of the release agent composition. Where more than one compound of the formula (I) is used, the quantity figures indicated above are based on the total amount of all compounds which fall within the formula (I). If the compound of the formula (I) is limited to a particular compound (I-1), then the quantities indicated above are based not merely on the particular compound (I-1) but instead on the total amount of compounds which fall within the formula (I). If, for example, the compound (I-1) is used in an amount of 5 wt %, then there may be at most 7 wt % of further compounds falling within the formula (I) present in the release agent composition.

Release Agent Composition—Polyether-Modified Alkyl-Polysiloxane (c):

The release agent composition used in accordance with the invention may further comprise at least one polyether-modified alkylpolysiloxane. The use of such siloxanes leads to reduced dirt pickup of the coated components produced in accordance with the invention.

Preferably the polyether-modified alkylpolysiloxane comprises at least one structural unit $(R^7)_2(OR^6)SiO_{1/2}$ and at least one structural unit $(R^7)_2SiO_{2/2}$, where $R^6$ is an ethylene oxide, propylene oxide, and butylene oxide group, more particularly a mixture of ethylene oxide and propylene oxide and butylene oxide groups, and $R^7$ is a $C_1$-$C_{10}$ alkyl group, more particularly a methyl group.

It is preferred in this context if the polyether-modified alkylpolysiloxane has a molar ratio of siloxane to ethylene oxide to propylene oxide to butylene oxide groups of 6:21:15:1 to 67:22:16:1.

It is preferred in this context, furthermore, if the polyether-modified alkylpolysiloxane has a molar ratio of the structural unit $(R^7)_2(OR^6)SiO_{1/2}$ to the structural unit $(R^7)_2SiO_{2/2}$ of 1:10 to 1:15, more particularly of 1:10 to 1:13. $R^6$ and $R^7$ here have the definitions recited above.

The release agent composition may comprise 0 wt % or 0.1 to 6 wt %, preferably 0.5 to 4 wt %, more particularly 0.8 to 3 wt %, based in each case on the total weight of the release agent composition, of polyether-modified alkylpolysiloxanes, more particularly of the specific polyether-modified alkylpolysiloxanes recited above. The absence of such compounds makes the composition less tacky. As a result, the effect of demolding of the coated component produced from the molding tool is improved.

Release Agent Composition—Polysiloxane of Formula (II) (d):

The release agent composition used in accordance with the invention further comprises at least one polysiloxane of general formula (II)

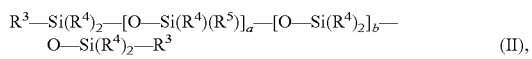

(II), in which

R$^3$ and R$^4$, in each case independently of one another, are a methyl group or a (HO—CH$_2$)$_2$—C (CH$_2$—CH$_3$)—CH$_2$—O—(CH$_2$)$_3$—* radical, R$^5$ is a methyl group, a is 0 or 1 to 10, and b is 3 to 30.

The (HO—CH$_2$)$_2$—C(CH$_2$—CH$_3$)—CH$_2$—O—(CH$_2$)$_3$—* radical here is bonded via the * symbol to the silicon atom.

Used with preference in accordance with the invention are polysiloxanes which have particular radicals R$^3$ and R$^4$. The use of such polysiloxanes has proven advantageous in relation to the improved demoldability, but without adversely affecting the adhesion of the crosslinked composition of the invention to the component. In one preferred embodiment of the present invention, therefore, in the general formula (II), the radical R$^3$ is a (HO—CH$_2$)$_2$—C(CH$_2$—CH$_3$)—CH$_2$—O—(CH$_2$)$_3$—* radical, the radical R$^4$ is a methyl group, the radical R$^5$ is a methyl group, a is 0, and b is 7 to 14.

Advantageously in accordance with the invention, the release agent composition comprises the at least one polysiloxane of the formula (II), more particularly the specific polysiloxanes recited above, in a particular total amount. It is therefore preferred in accordance with the invention if the release agent composition comprises the at least one polysiloxane of the general formula (II) in a total amount of 0.1 to 5 wt %, preferably 0.5 to 4 wt %, more particularly 0.8 to 2.5 wt %, based in each case on the total weight of the release agent composition. If more than one polysiloxane of the formula (II) is used, then the quantity figures indicated above are based on the total amount of all the polysiloxanes which fall within the formula (II). If the polysiloxane of the formula (II) is limited to particular polysiloxanes (II-1), then the quantities indicated above are based not only on the particular polysiloxanes (II-1), but instead on the total amount of polysiloxanes which fall within the formula (II). Where, for example, the particular polysiloxanes (II-1) are used in an amount of 2 wt %, there may be at most 3 wt % of further polysiloxanes which fall within the formula (II) present in the release agent composition.

Release Agent Composition—Binder B (e):

With preference in accordance with the invention, the release agent composition, as well as the constituents described above, comprises at least one binder B. The use of this binder B leads to the development of a flexible and stable coating on the component, but without adversely affecting the demoldability of the component.

Surprisingly it has emerged that the nature of the binder B is immaterial to the demoldability achieved with the release agent composition. A further surprise was that the release agent composition, independently of the binder B, has no adverse effect on the resulting coating, particularly on its surface quality and flexibility. The release agent composition may therefore include any desired binders B, without adversely affecting demoldability of the component produced or the outstanding properties of the coating produced with the composition on the component. Moreover, the resulting coatings can be adhesively bonded and/or coated with basecoat and/or clearcoat materials, without costly and inconvenient aftertreatment steps.

The at least one binder B is present preferably in a total amount (solids content) of 20 to 50 wt %, more preferably of 25 to 40 wt %, more particularly 25 to 35 wt %, based in each case on the total weight of the composition. If the binder is a dispersion or solution in a solvent, the above-recited total quantities are calculated using the solids content of the binder in each case. The use of the at least one binder B in the above-recited quantity ranges ensures the development of a flexible and stable coating on the component, but without adversely affecting the demoldability of the component.

With preference in accordance with the invention the binder B is selected from the group consisting of (i) poly (meth)acrylates, more particularly hydroxy-functional and/or carboxylate-functional and/or amine-functional poly (meth)acrylates, (ii) polyurethanes, more particularly hydroxy-functional and/or carboxylate-functional and/or amine-functional polyurethanes, (iii) polyesters, more particularly polyester polyols, (iv) polyethers, more particularly polyether polyols, (v) copolymers in the stated polymers, and (vi) mixtures thereof.

It is preferred in this context that the binder B is selected from hydroxy-functional poly(meth)acrylates and/or polyester polyols, more particularly from a mixture of at least one hydroxy-functional poly(meth)acrylate and at least one polyester polyol. The use of this mixture leads to coatings which have a high flexibility and also high resistance toward environmental influences. Moreover, irrespective of the surface nature of the material used for producing the component, a smooth surface is achieved. Furthermore, the coating obtained can without costly and inconvenient aftertreatment be adhesively bonded and/or coated with basecoat and/or clearcoat materials.

The at least one hydroxy-functional poly(meth)acrylate preferably possesses a hydroxyl number of 65 to 100 mg KOH/g, more preferably of 70 to 95 mg KOH/g, more particularly of 75 to 90 mg KOH/g or of 80 to 85 mg KOH/g. The hydroxyl number in the context of the present invention may be determined according to EN ISO 4629-2:2016 and is based in each case on the solids content.

The hydroxy-functional poly(meth)acrylate preferably possesses an acid number of less than 25 mg KOH/g, more preferably an acid number of 1 to 20 mg KOH/g, very preferably of 4 to 16 mg KOH/g, more particularly of 6 to 14 mg KOH/g or of 8 to 12 mg KOH/g. The acid number for the purposes of the present invention may be determined according to DIN EN ISO 2114:2002-06 (method A) and is based in each case on the solids content.

The number-average molecular weight $M_n$ and the weight-average molecular weight $M_w$ may be determined by means of gel permeation chromatography (GPC) using a polymethyl methacrylate standard (PMMA standard) (DIN 55672-1:2016-03). The number-average molecular weight $M_n$ of the hydroxy-functional poly(meth)acrylate is preferably in a range from 4000 to 10 000 g/mol, more preferably 5000 to 9000 g/mol, very preferably 5500 to 8000 g/mol, more particularly 6000 to 7500 g/mol. The weight-average molecular weight $M_w$ of the hydroxy-functional poly(meth) acrylate is preferably in a range from 8000 to 30 000 g/mol, more preferably 10 000 to 25 000 g/mol, very preferably 12 000 to 22 000 g/mol, more particularly 14 000 to 20 000 g/mol. The polydispersity $P_D$ $(=M_w/M_n)$ of the hydroxy-functional poly(meth)acrylate is preferably in the range from 2 to 3, more particularly from 2.2 to 2.8.

The hydroxy-functional poly(meth)acrylate preferably possesses a hydroxyl functionality of 5 to 15, more preferably of 6 to 14, more particularly of 8 to 12.

The hydroxy-functional poly(meth)acrylate may be obtained by means of the polymerization reactions that are commonplace and familiar to a person of ordinary skill in the art, from ethylenically unsaturated monomers, preferably monoethylenically unsaturated monomers. Initiators which may be used include peroxides, such as di-tert-butyl peroxide, for example. It is therefore preferred for the hydroxy-functional poly(meth)acrylate to be preparable by reaction of (a1) at least one hydroxy-functional (meth)acrylic ester, more particularly (meth)acrylic ester of the formula $HC=CR^x-COO-R^y-OH$, in which $R^x$ is H or $CH_3$ and $R^y$ is an alkylene radical having 2 to 6, preferably 2 to 4, more preferably 2 or 3 carbon atoms, (a2) at least one carboxy-functional ethylenically unsaturated monomer, more particularly (meth)acrylic acid, and (a3) at least one hydroxyl-free and carboxyl-free ester of (meth)acrylic acid and/or at least one hydroxyl-free and carboxyl-free vinyl monomer, more particularly styrene.

The hydroxy groups present in the hydroxy-functional poly(meth)acrylate are introduced via hydroxy-functional ethylenically unsaturated monomers (a1), preferably hydroxy-functional acrylic esters and/or hydroxy-functional methacrylic esters, when preparing the hydroxy-functional poly(meth)acrylate. Examples of hydroxy-functional (meth) acrylates are hydroxyethyl methacrylate, hydroxyethyl acrylate, hydroxypropyl methacrylate, and hydroxypropyl acrylate. Present with particular preference are hydroxyethyl methacrylate and 2-hydroxypropyl methacrylate. The amount of hydroxy-functional (meth)acrylic esters (a1) used in preparing the hydroxy-functional poly(meth)acrylates is calculated on the basis of the target range for the hydroxyl number, of 50 to 120 mg KOH/g.

The hydroxy-functional poly(meth)acrylate preferably contains small quantities of carboxyl groups. These groups are introduced into the poly(meth)acrylate during the polymerization reaction, through the use, for example, of carboxy-functional monomers (a2), more preferably of acrylic acid and/or methacrylic acid. These monomers (a2), especially (meth)acrylic acid, are present preferably in a total amount of 20 to 45 wt %, more preferably of 25 to 40 wt %, more particularly of 30 to 35 wt %, based in each case on the total weight of all the monomers used in preparing the hydroxy-functional poly(meth)acrylate.

Besides the hydroxy-functional (a1) and the carboxy-functional ethylenically unsaturated monomers (a1), use is also made when preparing the hydroxy-functional poly (meth)acrylate of ethylenically unsaturated monomers (a3), more particularly monoethylenically unsaturated monomers (a3), these monomers being free both of hydroxyl and of carboxyl groups. Employed with particular preference as vinyl monomer (a3) is styrene. The vinyl monomer (a3), more particularly styrene, is present preferably in a total amount of 30 to 60 wt %, more preferably of 35 to 55 wt %, more particularly of 40 to 50 wt %, based in each case on the total weight of all the monomers used in preparing the hydroxy-functional poly(meth)acrylate.

The hydroxy-functional poly(meth)acrylate may be used in an organic solvent, preferably an aprotic solvent. A typical solvent for this purpose, for example, is n-butyl acetate, which may also be used when preparing the at least one hydroxy-functional poly(meth)acrylate. If the hydroxy-functional poly(meth)acrylate is used in a solvent, then the solvent is of course reckoned not as part of the constituent, but instead as part of the solvent L.

The hydroxy-functional poly(meth)acrylate is preferably used in a particular total quantity. It is therefore advantageous in accordance with the invention if the hydroxy-functional poly(meth)acrylate is present in a total quantity of 10 wt % to 97 wt %, preferably of 40 to 70 wt %, more particularly of 40 to 50 wt %, based in each case on the total weight of the solids content of all the binders present in the composition.

The polyester polyol preferably possesses a hydroxyl number of 100 to 200 mg KOH/g, more preferably of 110 to 180 mg KOH/g, very preferably of 120 to 160 mg KOH/g, based in each case on the solids content.

The acid number of the polyester polyol is preferably 0 to 9 mg KOH/g, more particularly 0.2 to 2 mg KOH/g, based in each case on the solids content. The hydroxyl number and acid number of the polyester polyol may be determined as above in conjunction with the hydroxy-functional poly (meth)acrylate.

The number-average molecular weight of the polyester polyol is preferably in the range from 800 to 3000 g/mol, more preferably 1000 to 2000 g/mol, more particularly from 1000 to 1600 g/mol. The determination here is made as in connection with the determination of the molecular weight of the hydroxy-functional poly(meth)acrylate.

The polyester polyol is preferably branched.

The polyester polyol preferably possesses a hydroxyl functionality of 2.2 to 4, more preferably of 2.5 to 3.6, very preferably of 2.7 to 3.6.

The polyester polyol is preferably used in a particular total quantity. It is therefore advantageous in accordance with the invention if the polyester polyol is present in a total quantity of 40 wt % to 97 wt %, preferably of 40 to 70 wt %, more particularly of 50 to 65 wt %, based in each case on the total weight of the solids content of all the binders present in the composition.

The binder B may alternatively be selected from aqueous, anionically stabilized polyurethane dispersions, aqueous, cationically stabilized polyurethane dispersions, aqueous polyurethane-polyurea dispersions, and mixtures thereof. Suitable dispersions are described, for example, in the laid-open specifications EP 2 066 712 A1, EP 1 153 054 A1, and EP 1 153 052 A1.

Release Agent Composition—Crosslinking Agent V (f):

It may be preferable in accordance with the invention if the release agent composition comprises not only the aforesaid constituents and/or the at least one binder B but also a crosslinking agent V. With particular preference, the release agent composition used in accordance with the invention comprises a combination of the above-described binder B and the below-described crosslinking agent V.

The crosslinking agent V is preferably selected from the groups consisting of amino resins, polyisocyanates, blocked polyisocyanates, polycarbodiimides, UV light, heat, photoinitiators, and mixtures thereof.

Particular preference is given to using polyisocyanates and also polycarbodiimides as crosslinking agents V.

The use of polyisocyanates has been found appropriate especially when a mixture of the above-described at least one hydroxy-functional poly(meth)acrylate and the at least one polyester polyol is present as binder B in the composition of the invention.

In this context it is particularly preferred if the polyisocyanate possesses an NCO group functionality of greater than 2.4 to 5, preferably 2.6 to 4, more preferably 2.8 to 3.6.

Employed with particular preference in the context of the present invention are polyisocyanates which comprise at least one isocyanurate ring or at least one iminooxadiazinedione ring.

According to an alternative embodiment, two polyisocyanates different from one another may be present as crosslinking agents V, with the first polyisocyanate comprising at least one isocyanurate ring and the second polyisocyanate comprising at least one iminooxadiazinedione ring.

The polyisocyanate preferably comprises oligomers, preferably trimers or tetramers, of diisocyanates. With particular preference it comprises iminooxadiazinediones, isocyanurates, allophanates and/or biurets of diisocyanates. With particular preference the polyisocyanate comprises aliphatic and/or cycloaliphatic, very preferably aliphatic, polyisocyanates. Serving as a diisocyanate basis for the aforementioned oligomers, more particularly the aforementioned trimers or tetramers, is very preferably hexamethylene diisocyanate and/or isophorone diisocyanate, and especially preferably just hexamethylene diisocyanate.

The use of polycarbodiimides has been found appropriate especially when aqueous, anionically stabilized polyurethane dispersions, aqueous, cationically stabilized polyurethane dispersions, aqueous polyurethane-polyurea dispersions, and mixtures thereof are present as binders B in the composition of the invention.

The polycarbodiimides are preferably in the form of an aqueous dispersion. Polycarbodiimides used with particular preference are obtainable by reaction of polyisocyanates with polycarbodiimides and subsequent chain extension and/or termination by means of hydrophilic compounds containing hydroxyl groups and/or amine groups. Suitable dispersions are described in the laid-open specifications EP1644428 A2 and EP1981922 A2, for example.

Through the crosslinking agent V it is possible to influence, for example, the hardness, flexibility, and elasticity of the resulting cured coating. Use of polyisocyanates containing iminooxadiazinedione structures, in particular, leads to coatings of particular hardness, thereby preventing substrate structures propagating through to the cured coating surface and causing unwanted waviness there. Such polyisocyanates are available for example from Covestro under the name Desmodur N3900. Similar results may be achieved with polyisocyanates containing isocyanurate structures, as available for example under the name Desmodur N3800 from Covestro, in which case the coating is still hard but is more flexible.

The composition preferably comprises the at least one crosslinking agent V in a particular total quantity. It is therefore preferred in accordance with the invention if the at least one crosslinking agent V is present in a total quantity of 10 wt % to 40 wt %, preferably of 10 to 30 wt %, more particularly of 15 to 25 wt %, based in each case on the total weight of the composition.

It is preferred, furthermore, if the composition comprises a particular molar ratio of the functional groups of the crosslinking agent V to the groups of binder B that are reactive toward the crosslinking agent V. This ensures that crosslinking of the composition of the invention is sufficient. It is therefore advantageous if the molar ratio of the functional groups of the crosslinking agent V, especially of the NCO groups or carbodiimide groups, to the sum of the groups of the at least one binder B, especially hydroxyl groups or anionic groups, that are reactive toward the functional groups of the crosslinking agent V is 0.4:1 to 1:1, preferably 0.65:1 to 0.85:1, more particularly 0.7:1 to 0.8:1.

Depending on the particular binders B and crosslinking agents V present in the composition of the invention, the composition of the invention is configured as a one-component system or is obtainable by mixing two (two-component system) or more (multicomponent system) components. In thermochemically curable one-component systems, the components to be crosslinked, in other words binder and crosslinking agent, are present alongside one another, in other words in one component. A condition for this is that the components to be crosslinked react with one another effectively only at relatively high temperatures, of more than 100° C., for example, so as to prevent premature at least proportional thermochemical curing. Such a combination may be exemplified by hydroxy-functional polyesters and/or polyurethanes with melamine resins and/or blocked polyisocyanates as crosslinking agents.

In thermochemically curable two-component or multi-component systems, the components to be crosslinked, in other words binders and the crosslinking agents, are present separately from one another in at least two components, which are not combined until shortly before the application. This form is selected when the components to be crosslinked react with one another effectively even at ambient temperatures or slightly elevated temperatures of, for example, 40 to 90° C. Such a combination may be exemplified by hydroxy-functional polyesters and/or polyurethanes and/or poly(meth)acrylates with free polyisocyanates as crosslinking agents. Mixing may take place manually, with the appropriate amount of component 1 or 2 being introduced into a separate vessel, admixed with the corresponding quantity of component 2 or 1, and then mixed. Provision may also be made, however, for the mixing of the two components to take place automatically, this being preferred in the context of the present invention. In one preferred embodiment of the present invention, therefore, the two components are mixed in an automatic mixing system.

It is particularly preferred in this context if the automatic mixing system comprises a mixing unit, more particularly a static mixer, and also at least two devices for supplying the paint base component A and the curing component B, more particularly gear pumps and/or pressure valves. The static mixer may be a commercially available helical mixer, which is installed into the material supply line about 50 to 100 cm ahead of the atomizer. Preferably 12 to 18 mixing elements (for each element 1 cm in length, diameter 6 to 8 mm) are used in order to obtain sufficient mixing of the two components. Depending on the mixing energy, the potlife (doubling of the viscosity; determined according to DIN 53211) of the release agent composition when the above-described 12 to 18 mixing elements are used is 10 to 20 minutes. In order to prevent clogging of the material supply line, it is preferred if the mixing unit is programmed so that not only the helical mixer but also the downstream hose line and the atomizer are flushed with the paint base component A every 7 to 17 minutes. Where the release agent composition is applied by means of robots, this flushing operation takes place when the robot head is in a pre-defined position of rest. Depending on the length of the hose line, about 50 to 200 ml are discarded into a catch vessel. A preferred alternative to this procedure is the semicontinuous conveying of mixed release agent composition. If release agent composition is forced out regularly (every 7 to 17 minutes, likewise into a catch vessel), it is possible to reduce the quantity of discard material to a minimum (about 10 to 50 ml). Furthermore, provision may be made for the hose line from the mixer to the atomizer, and also the atomizer, to be flushed. This flushing operation is preferred in particular after prolonged downtime of the system or at the end of a shift, in order thus to ensure a long lifetime of the equipment and continuous quality of the release agent composition.

Also possible in principle is the utilization of a three-component mixing system. This may simplify the stable storage of systems which have already been catalyzed, without giving rise to greater cost and complexity in terms of process engineering.

Both in the case of manual mixing and in the case of the supply of the components for automatic mixing, the two components preferably each possess temperatures of to 70° C., more preferably 15 to 40° C., more particularly 20 to 30° C.

Where the composition of the invention is obtainable by mixing two or more components, the weight ratio of the binder-containing component to the crosslinker-containing component is preferably 100:10 to 100:100, more preferably from 100:20 to 100:80, more particularly from 100:50 to 100:70. The use of the above-described mixing ratios ensures sufficient crosslinking of the release agent composition and in that way provides an assurance of ready demoldability and also high adhesion to the surface of the component produced.

Release Agent Composition—Crosslinking Catalyst VK (g):

Furthermore, it may be advantageous in accordance with the invention if the release agent composition comprises at least one crosslinking catalyst VK. The crosslinking catalyst VK is present especially when the composition comprises at least one crosslinking agent V, more particularly polyisocyanates.

The crosslinking catalyst VK serves primarily to catalyze the reaction between the functional groups of the crosslinking agent V and the reactive groups of the at least one binder B.

The crosslinking catalyst is preferably selected from the group of the bismuth carboxylates.

It is preferred in this context if specific bismuth carboxylates are present. The bismuth carboxylates therefore preferably possess the general formula (III)

$$Bi[OOC(C_nH_{2n+1})]_3 \quad (III)$$

where n=5 to 15, preferably n=7 to 13, more particularly n=9 to 11.

The carboxylate radicals are preferably branched, and very preferably they have a tertiary or quaternary, preferably quaternary, carbon atom in the alpha-position to the carbon atom of the carboxylate group.

Among the bismuth carboxylates, bismuth trineodecanoate in particular has emerged as being especially suitable.

The bismuth carboxylates are preferably used in stabilized form in combination with the parent carboxylic acid of the carboxylate, $HOOC(C_nH_{2n+1})$, in which n possesses the definition indicated above. The free carboxylic acid here should formally not be regarded, for the purposes of this invention, as a constituent of the crosslinking catalyst VK, even if it may have not only the stabilizer effect but also, optionally, may serve as a catalysis promoter; instead, it is included among the further additives as described below.

The composition preferably comprises the at least one crosslinking catalyst VK in a particular total quantity. It is therefore preferred in accordance with the invention if the at least one crosslinking catalyst VK is present in a total amount of 0.01 wt % to 3.5 wt %, preferably of 0.1 to 2 wt %, more particularly of 0.4 to 1.5 wt %, based in each case on the total weight of the composition.

Release Agent Composition—Color Base BF (h):

The release agent composition may further comprise at least one color base BF. A color base BF here means a colorant with a precisely defined hue. The at least one color base BF is present especially when a colored coating is to be obtained on the component. By using the at least one color base BF it is possible to achieve high accuracy of hue. Moreover, a high diversity of hue is possible, since different color bases BF having different hues can be mixed with one another in order to achieve the desired hue.

The at least one color base BF is present preferably in a particular total quantity in the release agent composition. It is therefore advantageous in accordance with the invention if the release agent composition comprises the at least one color base BF in a total quantity of 5 to 40 wt %, more particularly of 10 to 20 wt %, based on the total weight of the composition. The use of the at least one color base BF in the total quantities recited above ensures a high intensity of hue.

With particular preference the at least one color base BF comprises at least one effect pigment and/or at least one coloring pigment.

Effect pigments are pigments which are able to produce a decorative effect in coatings and additionally, but not exclusively, to produce a coloring effect. The effect pigments are notable in particular for a plateletlike construction. Preferred effect pigments are, for example, platelet-shaped metallic effect pigments such as platelet-shaped aluminum pigments, gold bronzes, oxidized bronzes and/or iron oxide-aluminum pigments, pearlescent pigments and/or metal oxide-mica pigments, and/or other effect pigments such as platelet-shaped graphite, platelet-shaped iron oxide, multilayer effect pigments composed of PVD films, and/or liquid crystal polymer pigments. Particularly preferred are platelet-shaped metallic effect pigments, more particularly platelet-shaped aluminum pigments and/or coated metal oxide-mica pigments and/or borosilicates coated with metal oxides.

Examples of inorganic coloring pigments are white pigments such as titanium dioxide; black pigments such as carbon black, iron manganese black or spinel black; chromatic pigments such as ultramarine green, ultramarine blue or manganese blue, ultramarine violet or manganese violet, red iron oxide, molybdate red or ultramarine red; brown iron oxide, mixed brown, phases of spinel and corundum; or yellow iron oxide or bismuth vanadate. Examples of suitable organic coloring pigments are monoazo pigments, disazo pigments, anthraquinone pigments, benzimidazole pigments, quinacridone pigments, quinophthalone pigments, diketopyrrolopyrrole pigments, dioxazine pigments, indanthrone pigments, isoindoline pigments, isoindolinone pigments, azomethine pigments, thioindigo pigments, metal complex pigments, perinone pigments, perylene pigments, phthalocyanine pigments or aniline black.

The at least one effect pigment and/or the at least one coloring pigment are present preferably in a total amount of 0.5 to 70 wt %, based on the total weight of the color base BF.

Provision may also be made for the color base to comprise at least one binder. This binder serves for stable dispersing of the pigment and in that way ensures high intensity of hue and high homogeneity of hue on the part of the color base BF.

Binders used in the color base BF are preferably polyurethane polymers, more particularly anionically stabilized polyurethane polymers. By anionically stabilized polyurethane polymers are meant polyurethane polymers which comprise at least one group that can be converted by neutralizing agents into an anionic group (i.e., a potentially anionic group). Examples of the potentially anionic groups which can be converted into anionic groups by neutralizing agents include carboxylic, sulfonic and/or phosphonic acid groups, more particularly carboxylic acid groups.

The polyurethane polymers are obtainable by reaction of a prepolymer containing isocyanate groups with compounds that are reactive toward isocyanate groups. The components are reacted preferably in the customary and known organic solvents. The amount of organic solvents may vary within wide limits here, and ought to be sufficient for the formation of a prepolymer solution of suitable viscosity. In general up to 70 wt %, preferably 5 to 50 wt %, and more preferably less than 20 wt % of solvents are used, based on the solids content. Hence the reaction may for example be carried out, especially preferably, at a solvent content of 10 to 15 wt %, based on the solids content.

Polyurethane polymers of this kind preferably have a number-average molecular weight (determination: gel permeation chromatography with polystyrene as standard) of 1000 to 30 000 g/mol, more preferably of 1500 to 20 000 g/mol, and also an acid number of 5 to 70 mg KOH/g, more preferably of 10 to 30 mg KOH/g (based on the solids content), and are preparable by reaction, preferably chain extension, of prepolymers containing isocyanate groups.

The prepolymer containing isocyanate groups may be prepared by reaction of polyols having a hydroxyl number of 10 to 1800, preferably 50 to 1200 mg KOH/g (based on the solids content) with excess polyisocyanates at temperatures up to 150° C., preferably 50 to 130° C., in organic solvents which are unable to react with isocyanates. The equivalent ratio of NCO groups to OH groups is between 2.0:1.0 and >1.0:1.0, preferably between 1.4:1 and 1.1:1.

The polyols used for preparing the NCO prepolymer may be of low and/or high molecular mass. For preparing anionically stabilized polyurethane polymers, the polyols contain at least one anionic group and/or group amenable to formation of anions. Also possible is the accompanying use of low molecular weight polyols having a molecular weight of 60 to 400 daltons, for preparing the prepolymers containing isocyanate groups.

In order to obtain an NCO prepolymer having high flexibility, the fraction of a predominantly linear polyol that is added, with a preferred OH number of 30 to 150 mg KOH/g (based on the solids content), ought to be high. Up to 97 wt % of the total polyol may consist of saturated and unsaturated polyesters having a number-average molecular weight $M_n$ of 400 to 5000 daltons. Polyester diols are prepared by esterification of organic dicarboxylic acids or their anhydrides with organic diols, or derive from a hydroxycarboxylic acid or a lactone. Particular preference is given to using a linear polyester which is obtainable by reaction of aliphatic and aromatic dicarboxylic acids with aliphatic diols.

Besides the polyester, the NCO prepolymer is prepared using further polyols, with at least one polyol having a carboxyl, sulfonic acid and/or phosphonic acid groups. Preferred for use are alkanoic acids having two hydroxyl groups on the carbon atom in alpha-position. These polyols have at least one, generally 1 to 3 carboxyl groups in the molecule. They have two to about 25, preferably 3 to 10, carbon atoms. The carboxyl-containing polyol may account for 3 to 100 wt %, preferably 5 to 50 wt %, of the overall polyol constituent in the NCO prepolymer.

The amount of ionizable carboxyl groups available through the carboxyl group neutralization in salt form is at least 0.4 wt %, preferably at least 0.7 wt %, based on the solids of the NCO prepolymer. The upper limit is about 12 wt %. The amount of dihydroxyalkanoic acids in the non-neutralized prepolymer gives an acid number of mg KOH/g to 40 mg KOH/g (based on the solids content).

Further polyols, having no carboxyl, sulfonic acid and/or phosphonic acid groups, are preferably selected from $C_3$-$C_8$ alkanediols, especially from 1,6-hexanediol. These diols are used customarily in an amount of 0.5 to 15 wt %, preferably 1 to 7 wt %, based in each case on the total weight of the synthesis components used in preparing the anionically stabilized polyurethane polymers.

Typical polyfunctional isocyanates used for preparing the anionic polyurethane polymers are aliphatic, cycloaliphatic and/or aromatic polyisocyanates having at least two isocyanate groups per molecule. The isomers or isomer mixtures of organic diisocyanates are preferred. On account of their high stability with respect to ultraviolet light, (cyclo)aliphatic diisocyanates result in products with a low tendency to yellow. The polyisocyanate component used to form the prepolymer may also include a fraction of higher polyisocyanates, provided this does not cause any gelling. Suitable triisocyanates are products which form by trimerization or oligomerization of diisocyanates or by reaction of diisocyanates with polyfunctional compounds containing OH or NH groups. The average functionality may optionally be lowered by addition of monoisocyanates.

Examples of polyisocyanates which can be used include phenylene diisocyanate, tolylene diisocyanate, xylylene diisocyanate, bisphenylene diisocyanate, naphthylene diisocyanate, diphenylmethane diisocyanate, isophorone diisocyanate, cyclobutane diisocyanate, cyclopentylene diisocyanate, cyclohexylene diisocyanate, methylcyclo-hexylene diisocyanate, dicyclohexylmethane diisocyanate, ethylene diisocyanate, trimethylene diisocyanate, tetramethylene diisocyanate, pentamethylene diisocyanate, hexamethylene diisocyanate, propylene diisocyanate, ethylethylene diisocyanate, and trimethylhexane diisocyanate.

To prepare high-solids anionic polyurethane polymer dispersions, use is made in particular of diisocyanates of the general formula (IV)

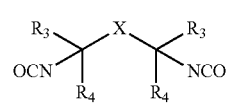

(IV)

where X is a divalent cyclic and optionally aromatic hydrocarbon radical, preferably an optionally halogen-, methyl- or methoxy-substituted dicyclohexylmethyl, naphthylene, diphenylene or 1,2-, 1,3- or 1,4-phenylene radical, more preferably a dicyclohexylmethyl radical, and $R_3$ and $R_4$ are hydrogen or an alkyl radical having 1 to 4 carbons, and preferably are hydrogen. One diisocyanate of the formula (IV) which is used with particular preference in the context of the present invention is 4,4'-methylenedicyclohexyl diisocyanate (also referred to as $H_{12}MDI$).

The NCO prepolymer contains at least 0.5 wt % of isocyanate groups, preferably at least 1 wt % of NCO, based on the solids. The upper limit is 15 wt %, preferably 10 wt %, more preferably 5 wt % of NCO.

The isocyanate groups of the prepolymer containing isocyanate groups are reacted with a modifier or chain extender. The modifier is preferably added in a quantity such that there are chain extensions and hence increases in molecular weight. Modifiers used are preferably organic compounds which comprise hydroxyl groups and/or secondary and/or primary amino groups, especially polyols and/or polyamines having a functionality of two, three and/or more. Examples of polyamines which can be used are ethylenediamine, trimethylenediamine, tetramethylenediamine, pentamethylenediamine, hexamethylenediamine, or diethylenetriamine. Examples of polyols which can be used are trimethylolpropane, 1,3,4-butanetriol, glycerol, erythritol, mesoerythritol, arabitol, adonitol, etc. Preference is given to using trimethylolpropane. The equivalent ratio of NCO prepolymer to modifier is preferably between 2.0:1.0 and 1.0:2.0, more particularly between 1.1:1 and 1:1.1.

In the context of the present invention, the anionically stabilized polyurethane polymer is obtainable with particular preference by reaction of an NCO prepolymer with a modifier in the form of a polyol, more particularly trimethylolpropane, the NCO prepolymer being obtainable by reaction of (i) 55 to 70 wt %, based on the total weight of the compounds (i) to (iv), of at least one polyester polyol having an OH number of 40 to 100 mg KOH/g, based on the solids content, and a number-average molecular weight $M_n$ of 1000 to 3000 Da, the polyester polyol preferably containing no olefinic double bonds, (ii) 3 to 7 wt %, based on the total weight of the compounds (i) to (iv), of at least one alkanoic acid having 3 to 8 carbon atoms and also two hydroxyl groups on the carbon atom in alpha-position, more particularly dimethylolpropionic acid, (iii) 0.5 to 3 wt %, based on the total weight of the compounds (i) to (iv), of at least one $C_3$-$C_8$ alkanediol, more particularly 1,6-hexanediol, and (iv) 25 to 30 wt %, based on the total weight of the compounds (i) to (iv), of at least one diisocyanate of the formula (IV) where X=dicyclohexylmethyl radical and $R_3$=$R_4$=hydrogen.

The equivalent ratio of NCO prepolymer to modifier is preferably between 2.0:1.0 and 1.0:2.0, more particularly between 1.1:1 and 1:1.1.

The anionically stabilized polyurethane polymer is neutralized with a base, preferably with an organic base, more particularly with N,N'-dimethylethanolamine, the base being added in a quantity such as to achieve a degree of neutralization of 50% to 100%, preferably of 60% to 80%.

The at least one binder, more particularly the aforesaid anionically stabilized polyurethane polymer, is present preferably in a quantity of 10 to 80 wt %, based on the total weight of the color base BF.

The color base BF may also comprise at least one solvent. Solvents which can be used are those already stated above in connection with the solvent L (component (a) of the composition of the invention). Employed with particular preference is butyl glycol and/or methyl ethyl ketone.

In one particularly preferred embodiment of the color base BF, therefore, the color base BF, based on its total weight, comprises (a1) 0.5 to 70 wt % of at least one effect pigment and/or at least one coloring pigment, (a2) 10 to 80 wt % of at least one binder selected from the group of polyurethane polymers, amino resin polymers, polyacrylate polymers, polyester polymers, and mixtures thereof, more particularly an above-recited anionically stabilized polyurethane polymer, and (a3) at least one organic solvent.

Release Agent Composition—Further Constituents (i)

Besides the above-recited constituents, the release agent composition used in accordance with the invention may comprise further constituents. Examples of further constituents are additives.

The at least one additive may be selected from the group consisting of wetting agents and/or dispersants, rheological assistants, flow control agents, UV absorbers, and mixtures thereof.

The at least one additive is present preferably in a total quantity of 0 wt % to 10 wt %, based on the total weight of the composition.

Process Step (B):

In process step B of the process of the invention, the release agent composition applied in step (A) is flashed. As already observed above, however, there is no crosslinking or curing of this composition in this step. In accordance with the invention, the flashing of the release agent composition in process step (B) takes place preferably for a period of 20 seconds to 120 minutes, more preferably of 20 seconds to 2 minutes, more particularly of 25 seconds to 45 seconds. The extremely short flashing time of the release agent composition allows it to be used in strictly indexed processes with extremely short operating times. One particularly preferred embodiment requires flashing times of only 25 to 45 seconds, after which the further process steps can be carried out. As a result, the release agent composition can be used even in strictly indexed processes, such as the rotary table process, for example.

The release agent composition is applied in step (A) preferably in a quantity such that a defined dry film thickness is obtained after the flashing in step (B). It is therefore preferred if the dry film thickness of the flashed release agent composition in process step (B) is 20 to 120 μm, more particularly 25 to 100 μm. This ensures that the coating produced on the component affords effective protection of the component against mechanical stressing and also exposure to environmental influences.

To accelerate the flashing of the release agent composition it is advantageous if the molding tool is heated. In process step (B) the release agent composition is flashed preferably at a temperature of to 100° C., more preferably 30 to 90° C., very preferably from 40 to 80° C., more particularly 50 to 70° C. The aforesaid temperatures result in rapid evaporation of the solvents present in the release agent composition, and also in formation of a film on the surface of the insides of the molding parts of the molding tool. At these temperatures, however, there is not sufficient crosslinking or curing of the release agent composition. In this way it is ensured that there is no deterioration in the adhesion between the release agent layer and the compositions (Z1, Z2) and materials (M1) used in the further steps. This is because the high adhesion of the coating generated by the release agent on the surface of the component is achieved through simultaneous crosslinking of the release agent and of the composition that forms the component.

Process Step (C):

This process step is optional and therefore need not necessarily be carried out. If this step is carried out, then at least one material M1 is inserted, the molding tool is optionally closed, and then heating takes place in order to activate the inserted material. With particular preference, the material M1 inserted in process step (C) is an outsole, more particularly an outsole made of thermoplastic polyurethane. Thermoplastic polyurethanes may be prepared by reaction of high molecular mass polyols, such as polyester polyols and polyether polyols, having a number-average molecular weight of 500 to 10 000 g/mol, with diisocyanates and also low molecular mass diols ($M_n$ 50 to 499 g/mol). It is also possible, however, to use outsoles made of other materials such as vulcanized or unvulcanized rubber and also mixtures of rubber and plastics.

Especially when using thermoplastic materials M1, it is advantageous if the molding tool is heated in process step (C) in order to render the material deformable and in that way to adapt it to the molding parts of the molding tool. It is therefore preferred if the molding tool is heated in process step (C) at 20 to 100° C., more preferably 30 to 90° C., very preferably 40 to 80° C., more particularly 50 to 70° C. The molding tool can be heated by supplying heat or by irradiation, with IR radiation, for example. Preferably the molding tool is heated by means of IR radiation.

Process Step (D):

In process step (D), a composition Z1 is injected into the closed molding tool, which optionally contains the material (M1) inserted beforehand. The closing of the molding tool here may take place hydraulically.

Composition Z1 is a crosslinkable composition. Accordingly, either the composition must be self-crosslinking, or the composition must include corresponding crosslinking agents. With particular preference, the composition Z1 applied in process step (D) is a polymer foam, more particularly a polyurethane foam material.

The polymer foams herein include, among others, elastomeric foams, more particularly flexible foams, but also thermoset foams, more particularly rigid foams. The foams may be open-cell, closed-cell or mixed-cell foams. The foams herein also include those known as integral foams.

Particularly preferred foams are polyurethane foam materials. These are customarily produced from one or more polyols and one or more polyisocyanates. The blowing agent added to the polyol component to form the foam is usually water, which reacts with part of the polyisocyanate to form carbon dioxide, the reaction therefore being accompanied by foaming. Soft to elastic foams, especially flexible foams, are obtained using long-chain polyols. If short-chain polyols are used, highly crosslinked structures are formed, leading generally to the formation of rigid foams. The polyols used in producing the polyurethane foam materials preferably comprise polyester polyols, polyether polyols and/or polyester polyether polyols, and are accordingly selected preferably from the group of the aforesaid polyols.

Fibers as well may be admixed to the foam formulations. When such formulations are foamed, the products are known as fiber-reinforced foams. Fibers are preferably used when producing rigid foams.

Application may take place by means of devices known in principle. With particular preference the composition Z1 is applied automatically in process step (D).

Provision may be made in accordance with the invention for the composition Z1 to be injected into the molding tool in a plurality of stages. This is carried out especially when the sole mold of the molding tool is divided into a plurality of fields. In that case the composition Z1 in a first stage is injected into the first field and in a second stage is injected into the second field. This technique is employed, for example, when the first field represents an outsole and the second field represents a self-contained sole frame. In this case, the composition Z1 is injected first into the mold compartment for the sole and subsequently into the mold compartment of the self-contained sole frame.

Injection is followed by the crosslinking and/or curing of the composition Z1 and of the release agent composition introduced beforehand. The synchronous crosslinking of the two compositions results in a high level of adhesion of the crosslinked release agent coating to the cured composition Z1 and hence improves the mechanical and optical properties of the resultant coated component.

To achieve crosslinking, it is preferably conducted at elevated temperatures. It is therefore advantageous if the curing in process step (D) takes place at temperatures of 45 to 75° C., preferably 50 to 70° C., more particularly 52 to 65° C.

The curing in process step (D) takes place preferably for a period of 1 to 20 minutes, more preferably of 3 to 15 minutes, more particularly of 4 to 10 minutes. Such periods ensure sufficient crosslinking of the release agent composition and also of the composition Z1 and therefore also permit easy demoldability of the coated and cured composition Z1.

Process Step (E):

Provision may be made in accordance with the invention to apply and likewise crosslink at least one further composition Z2. The composition Z2 applied in process step (E) is preferably a polymer foam, more particularly a polyurethane foam material, which is preferably different from the composition Z1. This process step may be repeated as often as desired. Accordingly, it is also possible for further compositions Z3, Z4, etc., to be applied, preferably likewise being different from one another. The compositions may differ, for example, in density, in color, or in the material used. In this way, multilayer plastics soles can be produced, the properties of the soles being adapted through the choice of the compositions Z1, Z2, etc. If this step is carried out, the parts of the molding tool are preferably moved, before injection of the composition Z2, in such a way as to form in the molding tool a hollow compartment into which the composition Z2 is injected. This may be done, for example, by moving the core plate or the molding part that closes the molding tool at the top.

The curing or crosslinking of the compositions applied in step (E) takes place as described for process step (D).

Process Step (F):

In process step (F) of the process of the invention, the molding tool is opened, in particular automatically. Provision may be made in accordance with the invention for the position of at least one molding part of the molding tool to be altered, in particular hydraulically, before the molding tool is opened. Furthermore, provision may be made requiring closure mechanisms for the closing of the molding tool to be opened before the molding tool is opened.

Process Step (G):

In process step (G) of the process of the invention, the molded and coated component is removed, in particular automatically. The removal of the component may take place with use of assistants.

Process Step (H):

Following removal of the coated component, provision may be made in accordance with the invention for said component to be aftertreated. The aftertreatment (H) preferably comprises trimming and/or polishing and/or lacquering of the coated component produced. The coated component produced may if desired be coated directly—without a grinding procedure, optionally after simple cleaning—with further coating materials such as, for example, with one or more basecoat materials and one or more clearcoat materials, to form one or more basecoat films and one or more clearcoat films, respectively. The component produced is preferably not coated with a surfacer coat; instead, directly, a basecoat film or a topcoat film, more particularly a clearcoat film, is applied directly. In that case provision may be made for the basecoat film(s) and the clearcoat film(s) to be cured separately or jointly.

As basecoat and topcoat, more particularly clearcoat, materials it is possible, in principle, to use all the basecoat and clearcoat materials, respectively, that are conventionally employed in lacquering. Such basecoat and clearcoat materials are available, for example, from BASF Coatings GmbH; clearcoat materials having been found particularly suitable are, in particular, clearcoat materials of the Ever-Gloss product line.

Further Process Steps:

Provision may be made in accordance with the invention for the process to comprise further process steps in addition to the mandatory process steps (A), (B), and (D) to (G) and also the optional process steps (C) and (H). The process preferably includes a further process step (I) in which, after the removal of the coated component in process step (G), the molding tool is cleaned, being more particularly cleaned manually. The molding tool may be cleaned by sandblasting or by use of organic solvents. This cleaning step ensures that the surface of the molding parts of the molding tool have no unwanted contaminants to lower the adhesion of the release agent composition to the surface of the molding parts and hence to lower the release effect of the release agent composition.

In this context it is advantageous if the further process step (I) is carried out after 20 to 100, more particularly 20 to 50, repetitions of the process steps (A) to (G). Cleaning of the molding tool after a number of 20 to 100 coated components produced permits an efficient process regime, since the molding tool does not have to be cleaned after just being used once. Furthermore, the quantity of cleaning wastes is reduced.

The process of the invention allows injection-molded, coated components to be produced, in highly indexed processes, the components being able to be processed further without costly and inconvenient aftertreatment. Even without recoating, the coating obtained on the component by the release agent is highly elastic or flexible and also UV-resistant and nonshiny, hence resulting not only in damage-free demolding of the coated component but also in effective protection of the coated component produced with respect to environmental influences such as UV radiation, dirt or the like, as early as directly after the production of the coated component. Because the composition used in the process of the invention at the same time has a release effect, this agent can be used both as a release agent and also as a coating agent. Accordingly there is no need for the use of a separate release agent, requiring costly and inconvenient removal before aftertreatment of the component. Because of the extremely short flashing times, this agent can also be used in highly indexed processes, of which rotary table components produced have a regular surface even when produced using foams which, in combination with conventional release agents, lead to components having a very irregular surface. Since only small residues of the release agent remain in the molding tool, the molding tools used do not have to be cleaned before every further application of the release agent.

The invention is described in particular by the following embodiments:

According to a first embodiment, the present invention relates to an automatic process for injection molding of coated components, more particularly soles of plastic, comprising the following steps in the order indicated:

(A) application of a release agent composition to at least one inside of at least one molding part of a closable molding tool, (B) flashing of the release agent composition applied in step (A), (C) optional insertion of a first material M1, optional closing of the molding tool, and heating of the molding tool, (D) injection of a composition Z1 into the closed molding tool and curing of the composition Z1, (E) optional injection of at least one further composition Z2 into the closed molding tool and curing of the composition(s), (F) opening of the molding tool, (G) removal of the molded component, and (H) optional aftertreatment of the molded component, where the release agent composition comprises:

(a) at least one solvent L, (b) at least one compound of the general formula (I)

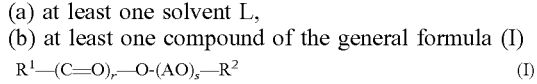

in which $R^1$ is a saturated or unsaturated, aliphatic hydrocarbon radical having 6 to 30 carbon atoms, $R^2$ is H, a $PO(OH)_2$ radical, or the optionally partially phosphated radical of a monosaccharide or disaccharide, or the optionally partially phosphated radical of an alditol, AO stands for one or more alkylene oxide radicals selected from the group consisting of ethylene oxide, propylene oxide and butylene oxide, r is 0 or 1, and s is 0 to 30;

(c) optionally at least one polyether-modified alkylpolysiloxane, (d) at least one polysiloxane of the general formula (II)

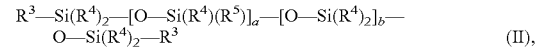

in which $R^3$ and $R^4$, in each case independently of one another, are a methyl group or a $(HO-CH_2)_2-C(CH_2-CH_3)-CH_2-O-(CH_2)_3-*$ radical, $R^5$ is a methyl group, a is 0 or 1 to 10, and b is 3 to 30; and (e) optionally at least one binder B.

According to a second embodiment, the present invention relates to a manual process according to embodiment 1, wherein the release agent composition is applied in process step (A) using application robots.

According to a third embodiment, the present invention relates to a manual process according to embodiment 2, wherein, on application of the release agent composition using application robots, nozzles are used that have a diameter of 0.05 to 1.5 mm, preferably of 0.08 to 1 mm, more particularly of 0.1 to 0.8 mm.

According to a fourth embodiment, the present invention relates to a manual process according to any of the preceding embodiments, wherein the molding tool in process step (A) has a temperature of 20 to 100° C., more preferably 30 to 90° C., very preferably 40 to 80° C., more particularly 50 to 70° C.

According to a fifth embodiment, the present invention relates to a manual process according to any of the preceding embodiments, wherein the release agent composition is provided in an automatic mixing system.

According to a sixth embodiment, the present invention relates to a manual process according to embodiment 5, wherein the automatic mixing system comprises a mixing unit, more particularly a static mixer, and also at least two devices for the supply of components, more particularly gear pumps and/or pressure valves.

According to a seventh embodiment, the present invention relates to a manual process according to any of the preceding embodiments, wherein the release agent composition has a viscosity of 10 to 60 s, more particularly of 20 to 30 s (DIN4 flow cup), measured according to DIN EN ISO 2431 (March 2012).

According to an eighth embodiment, the present invention relates to a manual process according to any of the preceding embodiments, wherein the release agent composition has a solids content of 30 to 60 wt %, preferably of 35 to 55 wt %, more preferably of 40 to 50 wt %, more particularly of 42 to 48 wt %, measured according to ASTM D2369 (2015) (110° C., 60 min).

According to a ninth embodiment, the present invention relates to a manual process according to any of the preceding embodiments, wherein the at least one solvent L is selected from organic solvents, water, and mixtures thereof and is present in a total quantity of 40 to 70 wt %, more preferably 45 to 65 wt %, and very preferably 50 to 60 wt %, more particularly 52 to 58 wt %, based in each case on the total weight of the composition.

According to a tenth embodiment, the present invention relates to a manual process according to any of the preceding embodiments, wherein, in the general formula (I), $R^1$ is a saturated or unsaturated aliphatic hydrocarbon radical having 10 to 24 carbon atoms, $R^2$ is H, a $PO(OH)_2$ radical, or the optionally partially phosphated radical of a monosaccharide or disaccharide, or the optionally partially phosphated radical of an alditol, more particularly of sorbitol, AO stands for one or more alkylene oxide radicals selected from the group consisting of ethylene oxide and propylene oxide, r is 0 or 1, and s is 0 or 1 to 25.

According to an eleventh embodiment, the present invention relates to a manual process according to any of the preceding embodiments, wherein, in the general formula (I), $R^2$ is a saturated or unsaturated, aliphatic hydrocarbon radical having 10 to 24 carbon atoms, $R^2$ is H, a $PO(OH)_2$ radical, or the optionally partially phosphated radical of a monosaccharide or the optionally partially phosphated radical of an alditol, more particularly of sorbitol, AO stands for one or more alkylene oxide radicals selected from the group consisting of ethylene oxide and propylene oxide, and the ethylene oxide fraction in the entirety of the radicals AO is at least 70 mol %, r is 0 or 1, and s is 0 or s is 6 to 20.

According to a twelfth embodiment, the present invention relates to a manual process according to any of the preceding embodiments, wherein the at least one compound of the general formula (I) is present in a total quantity of 0.1 to 10 wt %, more preferably 0.5 to 5 wt %, more particularly 1.5 to 4 wt %, based in each case on the total weight of the release agent composition.

According to a thirteenth embodiment, the present invention relates to a manual process according to any of the preceding embodiments, wherein the polyether-modified alkylpolysiloxane comprises at least one structural unit $(R^7)_2(OR^6)SiO_{1/2}$ and at least one structural unit $(R^7)_2SiO_{2/2}$, where $R^6$ is an ethylene oxide, propylene oxide, and butylene oxide group, more particularly a mixture of ethylene oxide and propylene oxide and butylene oxide groups, and $R^7$ is a $C_1$-$C_{10}$ alkyl group, more particularly a methyl group.

According to a fourteenth embodiment, the present invention relates to a manual process according to embodiment 13, wherein the polyether-modified alkyl-polysiloxane has a molar ratio of siloxane to ethylene oxide groups to propylene oxide groups to butylene oxide groups of 6:21:15:1 to 67:22:16:1.

According to a fifteenth embodiment, the present invention relates to a manual process according to either of embodiments 13 or 14, wherein the polyether-modified alkylpolysiloxane has a molar ratio of the structural unit $(R^7)_2(OR^6)SiO_{1/2}$ to the structural unit $(R^7)_2SiO_{2/2}$ of 1:10 to 1:15, more particularly of 1:10 to 1:13.

According to a sixteenth embodiment, the present invention relates to a manual process according to any of the preceding embodiments, wherein the at least one polyether-modified alkylpolysiloxane is present in a total amount of 0 wt % or of 0.1 to 6 wt %, preferably 0.5 to 4 wt %, more particularly 0.8 to 3 wt %, based in each case on the total weight of the release agent composition.

According to a seventeenth embodiment, the present invention relates to a manual process according to any of the preceding embodiments, wherein, in the general formula (II), the radical $R^3$ is a $(HO-CH_2)_2-C(CH_2-CH_3)-CH_2-O-(CH_2)_3-*$ radical, the radical $R^4$ is a methyl group, the radical $R^5$ is a methyl group, a is 0, and b is 7 to 14.

According to an eighteenth embodiment, the present invention relates to a manual process according to any of the preceding embodiments, wherein said composition comprises the at least one polysiloxane of the general formula (II) in a total amount of 0.1 to 5 wt %, preferably 0.5 to 4 wt %, more particularly 0.8 to 2.5 wt %, based in each case on the total weight of the release agent composition.

According to a nineteenth embodiment, the present invention relates to a manual process according to any of the preceding embodiments, wherein the at least one binder B is present in a total quantity (solids content) of 20 to 50 wt %, preferably of 25 to 40 wt %, more particularly of 25 to 35 wt %, based in each case on the total weight of the composition.

According to a twentieth embodiment, the present invention relates to a manual process according to any of the preceding embodiments, wherein the binder B is selected from the group consisting of (i) poly(meth)acrylates, more particularly hydroxy-functional and/or carboxylate-functional and/or amine-functional poly(meth)acrylates, (ii) polyurethanes, more particularly hydroxy-functional and/or carboxylate-functional and/or amine-functional polyurethanes, (iii) polyesters, more particularly polyester polyols, (iv) polyethers, more particularly polyether polyols, (v) copolymers in the stated polymers, and (vi) mixtures thereof.

According to a twenty-first embodiment, the present invention relates to a manual process according to embodiment 20, wherein the binder B is selected from hydroxy-functional poly(meth)acrylates and/or polyester polyols, more particularly from a mixture of at least one hydroxy-functional poly(meth)acrylate and at least one polyester polyol.

According to a twenty-second embodiment, the present invention relates to a manual process according to either of the preceding embodiments 20 and 21, wherein the hydroxy-functional poly(meth)acrylate has a hydroxyl number of 50 to 120 mg KOH/g, preferably of 70 to 95 mg KOH/g, more particularly of 75 to 90 mg KOH/g or of 80 to 85 mg KOH/g.

According to a twenty-third embodiment, the present invention relates to a manual process according to any of the preceding embodiments 20 to 22, wherein the hydroxy-functional poly(meth)acrylate has an acid number of 1 to 20 mg KOH/g, more particularly 6 to 14 mg KOH/g or 8 to 12 mg KOH/g, and/or possesses a number-average molecular weight $M_n$ of 4000 to 10 000 g/mol, preferably 5000 to 9000 g/mol, more preferably 5500 to 8000 g/mol, more particularly 6000 to 7500 g/mol.

According to a twenty-fourth embodiment, the present invention relates to a manual process according to any of the preceding embodiments 20 to 23, wherein the hydroxy-functional poly(meth)acrylate has a hydroxyl functionality of 5 to 15, preferably of 6 to 14, more particularly of 8 to 12.

According to a twenty-fifth embodiment, the present invention relates to a manual process according to any of the preceding embodiments 20 to 24, wherein the hydroxy-functional poly(meth)acrylate is preparable by reaction of
(a1) at least one hydroxy-functional (meth)acrylic ester, more particularly (meth)acrylic ester of the formula HC=CR$^x$—COO—R$^y$—OH, in which R$^x$ is H or CH$_3$ and R$^y$ is an alkylene radical having 2 to 6, preferably 2 to 4, more preferably 2 or 3 carbon atoms,
(a2) at least one carboxy-functional ethylenically unsaturated monomer, more particularly (meth)acrylic acid, and
(a3) at least one hydroxyl-free and carboxyl-free ester of (meth)acrylic acid and/or at least one hydroxyl-free and carboxyl-free vinyl monomer, more particularly styrene.

According to a twenty-sixth embodiment, the present invention relates to a manual process according to embodiment 25, wherein the carboxy-functional ethylenically unsaturated monomer (a2), more particularly (meth)acrylic acid, is present in a total quantity of 20 to 45 wt %, preferably of 25 to 40 wt %, more particularly of 30 to 35 wt %, based in each case on the total weight of all the monomers used in preparing the hydroxy-functional poly (meth)acrylate.

According to a twenty-seventh embodiment, the present invention relates to a manual process according to either of the preceding embodiments 25 or 26, wherein the vinyl monomer (a3), more particularly styrene, is present in a total quantity of 30 to 60 wt %, preferably of 35 to 55 wt %, more particularly of 40 to 50 wt %, based in each case on the total weight of all the monomers used in preparing the hydroxy-functional poly(meth)acrylate.

According to a twenty-eighth embodiment, the present invention relates to a manual process according to any of the preceding embodiments 20 to 27, wherein the hydroxy-functional poly(meth)acrylate is present in a total quantity of 10 wt % to 97 wt %, preferably of 40 to 70 wt %, more particularly of 40 to 50 wt %, based in each case on the total weight of the solids content of all binders present in the release agent composition.

According to a twenty-ninth embodiment, the present invention relates to a manual process according to any of the preceding embodiments 20 to 28, wherein the polyester polyol has a hydroxyl number of 100 to 200 mg KOH/g, preferably of 110 to 180 mg KOH/g, more particularly of 120 to 160 mg KOH/g.

According to a thirtieth embodiment, the present invention relates to a manual process according to any of the preceding embodiments 20 to 29, wherein the polyester polyol has an acid number of 0 to 9 mg KOH/g, more particularly 0.2 to 2 mg KOH/g, and/or possesses a number-average molecular weight of 800 to 3000 g/mol, preferably 1000 to 2000 g/mol, more particularly of 1000 to 1600 g/mol.

According to a thirty-first embodiment, the present invention relates to a manual process according to any of the preceding embodiments 20 to 30, wherein the polyester polyol is branched.

According to a thirty-second embodiment, the present invention relates to a manual process according to any of the preceding embodiments 20 to 31, wherein the polyester polyol has a hydroxyl functionality of 2.2 to 4, preferably of 2.5 to 3.6, more particularly of 2.7 to 3.6.

According to a thirty-third embodiment, the present invention relates to a manual process according to any of the preceding embodiments 20 to 32, wherein the polyester polyol is present in a total quantity of 40 wt % to 97 wt %, preferably of 40 to 70 wt %, more particularly of 50 to 65 wt %, based in each case on the total weight of the solids content of all binders present in the composition.

According to a thirty-fourth embodiment, the present invention relates to a manual process according to any of the preceding embodiments, wherein the release agent composition additionally comprises at least one crosslinking agent V.

According to a thirty-fifth embodiment, the present invention relates to a manual process according to embodiment 34, wherein the crosslinking agent V is selected from the group consisting of amino resins, polyisocyanates, blocked polyisocyanates, polycarbo-diimides, UV light, heat, photoinitiators, and mixtures thereof.

According to a thirty-sixth embodiment, the present invention relates to a manual process according to embodiment 35, wherein the polyisocyanate possesses an NCO group functionality of greater than 2.4 to 5, preferably 2.6 to 4, more preferably 2.8 to 3.6.

According to a thirty-seventh embodiment, the present invention relates to a manual process according to either of the preceding embodiments 35 and 36, wherein the polyisocyanate comprises at least one isocyanurate ring or at least one iminooxadiazinedione ring.

According to a thirty-eighth embodiment, the present invention relates to a manual process according to either of the preceding embodiments 35 and 36, wherein two polyisocyanates different from one another are present, the first polyisocyanate comprising at least one isocyanurate ring and the second polyisocyanate comprising at least one iminooxadiazinedione ring.

According to a thirty-ninth embodiment, the present invention relates to a manual process according to any of the preceding embodiments 34 to 38, wherein the at least one crosslinking agent V is present in a total quantity of 10 wt % to 40 wt %, preferably of 10 to 30 wt %, more particularly of 15 to 25 wt %, based in each case on the total weight of the release agent composition.

According to a fortieth embodiment, the present invention relates to a manual process according to any of the preceding embodiments 20 to 39, wherein the molar ratio of the functional groups of the crosslinking agent V, more particularly of the NCO groups or carbodiimide groups, to the sum of the groups in the at least one binder B, more particularly hydroxyl groups, that are reactive toward the functional groups of the crosslinking agent V is 0.4:1 to 1:1, preferably 0.65:1 to 0.85:1, more particularly 0.7:1 to 0.8:1.

According to a forty-first embodiment, the present invention relates to a manual process according to any of the preceding embodiments, wherein the release agent composition additionally comprises at least one crosslinking catalyst VK.

According to a forty-second embodiment, the present invention relates to a manual process according to embodiment 41, wherein the crosslinking catalyst VK is selected from the group of the bismuth carboxylates.

According to a forty-third embodiment, the present invention relates to a manual process according to embodiment 42, wherein the crosslinking catalyst VK from the group of the bismuth carboxylates has the general formula (III)

where n=5 to 15, preferably n=7 to 13, more particularly n=9 to 11.

According to a forty-fourth embodiment, the present invention relates to a manual process according to any of the preceding embodiments 41 to 43, wherein the at least one crosslinking catalyst VK is present in a total quantity of 0.01 wt % to 3.5 wt %, preferably of 0.1 to 2 wt %, more particularly of 0.4 to 1.5 wt %, based in each case on the total weight of the release agent composition.

According to a forty-fifth embodiment, the present invention relates to a composition according to any of the preceding embodiments, wherein the release agent composition additionally comprises at least one color base BF.

According to a forty-sixth embodiment, the present invention relates to a composition according to embodiment 45, wherein at least one color base BF is present in a total quantity of 5 to 40 wt %, more particularly of 10 to 20 wt %, based on the total weight of the composition.

According to a forty-seventh embodiment, the present invention relates to a composition according to either of the embodiments 45 and 46, wherein the color base BF comprises at least one effect pigment and/or at least one coloring pigment, preferably in a total quantity of 0.5 to 70 wt %, based on the total weight of the color base BF.

According to a forty-eighth embodiment, the present invention relates to a composition according to embodiment 47, wherein the at least one effect pigment (a1) is selected from the group of platelet-shaped metallic effect pigments, pearlescent pigments, metal oxide-mica pigments, platelet-shaped graphite, platelet-shaped iron oxide, multilayer effect pigments from PVD films, liquid crystal polymer pigments, and mixtures thereof, more particularly from platelet-shaped aluminum pigments and/or coated metal oxide-mica pigments and/or metal oxide-coated borosilicates.

According to a forty-ninth embodiment, the present invention relates to a composition according to either of the embodiments 47 and 48, wherein the at least one coloring pigment (a1) is selected from the group of white pigments, black pigments, chromatic pigments, monoazo pigments, disazo pigments, anthraquinone pigments, benzimidazole pigments, quinacridone pigments, quinophthalone pigments, diketopyrrolopyrrole pigments, dioxazine pigments, indanthrone pigments, isoindoline pigments, isoindolinone pigments, azomethine pigments, thioindigo pigments, metal complex pigments, perinone pigments, perylene pigments, phthalocyanine pigments, aniline black, and mixtures thereof.

According to a fiftieth embodiment, the present invention relates to a composition according to any of the embodiments 45 to 49, wherein the color base BF comprises at least one binder selected from the group of polyurethane polymers, amino resin polymers, polyacrylate polymers, polyester polymers, and mixtures thereof, especially anionically stabilized polyurethane polymers, preferably in a total quantity of 10 to 80 wt %, based on the total weight of the color base BF.

According to a fifty-first embodiment, the present invention relates to a composition according to embodiment 50, wherein the anionically stabilized polyurethane polymer is obtainable by reaction of an NCO prepolymer with a modifier in the form of a polyol, more particularly trimethylolpropane, the NCO prepolymer being obtainable by reaction of
  (i) 55 to 70 wt %, based on the total weight of the compounds (i) to (iv), of at least one polyester polyol having an OH number of 40 to 100 mg KOH/g, based on the solids content, and a number-average molecular weight $M_n$ of 1000 to 3000 Da, the polyester polyol preferably containing no olefinic double bonds,
  (ii) 3 to 7 wt %, based on the total weight of the compounds (i) to (iv), of at least one alkanoic acid having 3 to 8 carbon atoms and also two hydroxyl groups on the carbon atom in alpha-position, more particularly dimethylolpropionic acid,
  (iii) 0.5 to 3 wt %, based on the total weight of the compounds (i) to (iv), of at least one $C_3$-$C_8$ alkanediol, more particularly 1,6-hexanediol, and
  (iv) 25 to 30 wt %, based on the total weight of the compounds (i) to (iv), of at least one diisocyanate of the formula (IV) where X=dicyclohexylmethyl radical and $R_3=R_4$=hydrogen, where the equivalent ratio of NCO prepolymer to modifier is between 2.0:1.0 and 1.0:2.0, more particularly between 1.1:1 and 1:1.1.

According to a fifty-second embodiment, the present invention relates to a composition according to either of the embodiments 50 and 51, wherein the anionically stabilized polyurethane polymer has a degree of neutralization of 50% to 100%, preferably of 60% to 80%.

According to a fifty-third embodiment, the present invention relates to a manual process according to any of the preceding embodiments, wherein at least one additive selected from the group consisting of wetting agents and/or dispersants, rheological assistants, flow control agents, UV absorbers, and mixtures thereof is additionally present.

According to a fifty-fourth embodiment, the present invention relates to a manual process according to embodiment 53, wherein the at least one additive is present in a total quantity of 0 wt % to 10 wt %, based on the total weight of the composition.

According to a fifty-fifth embodiment, the present invention relates to a manual process according to any of the preceding embodiments, wherein the release agent composition is flashed in process step (B) for a period of 20 seconds to 120 minutes, preferably of 20 seconds to 2 minutes, more particularly of 25 seconds to 45 seconds.

According to a fifty-sixth embodiment, the present invention relates to a manual process according to any of the preceding embodiments, wherein the dry film thickness of the flashed release agent composition in process step (B) is 20 to 120 μm, more particularly 25 to 100 μm.

According to a fifty-seventh embodiment, the present invention relates to a manual process according to any of the preceding embodiments, wherein the release agent composition is flashed in process step (B) at a temperature of 20 to 100° C., more preferably 30 to 90° C., very preferably 40 to 80° C., more particularly 50 to 70° C.

According to a fifty-eighth embodiment, the present invention relates to a manual process according to any of the preceding embodiments, wherein the material M1 inserted in process step (C) is an outsole, more particularly an outsole made of thermoplastic polyurethane.

According to a fifty-ninth embodiment, the present invention relates to a manual process according to any of the preceding embodiments, wherein the molding tool is heated in process step (C) at 20 to 100° C., more preferably 30 to 90° C., very preferably 40 to 80° C., more particularly 50 to 70° C.

According to a sixtieth embodiment, the present invention relates to a manual process according to any of the preceding embodiments, wherein the composition Z1 applied in process step (D) is a polymer foam, more particularly a polyurethane foam material.

According to a sixty-first embodiment, the present invention relates to a manual process according to any of the preceding embodiments, wherein the composition Z1 is applied automatically in process step (D).

According to a sixty-second embodiment, the present invention relates to a manual process according to any of the preceding embodiments, wherein the crosslinking in process step (F) takes place at temperatures of 45 to 75° C., preferably 50 to 70° C., more particularly 52 to 65° C.

According to a sixty-third embodiment, the present invention relates to a manual process according to any of the preceding embodiments, wherein the crosslinking in process step (F) takes place for a period of 1 to 20 minutes, preferably after 3 to 15 minutes, more particularly after 4 to 10 minutes.

According to a sixty-fourth embodiment, the present invention relates to a manual process according to any of the preceding embodiments, wherein the composition Z2 applied in process step (G) is a polymer foam, more particularly a polyurethane foam material, which is preferably different from the composition Z1.

According to a sixty-fifth embodiment, the present invention relates to a manual process according to any of the preceding embodiments, wherein the after-treatment (J) comprises trimming and/or polishing and/or lacquering of the component produced and coated.

According to a sixty-sixth embodiment, the present invention relates to a manual process according to embodiment 65, wherein the aftertreatment (J) comprises lacquering, where to the coating of the component, without an intermediate grinding procedure, at least one basecoat film and/or at least one clearcoat film is applied, and where the basecoat film(s) and clearcoat film(s) are cured separately or jointly.

According to a sixty-seventh embodiment, the present invention relates to a manual process according to any of the preceding embodiments, wherein the process comprises a further process step in which the molding tool, after the removal of the coated component in process step (G), is cleaned, more particularly manually cleaned.

According to a sixty-eighth embodiment, the present invention relates to a manual process according to embodiment 67, wherein the further process step is carried out after 20 to 100, more particularly 20 to 50, repetitions of process steps (A) to (G).

EXAMPLES

Description of Methods:
1. Solids Content (Solids, Nonvolatile Fraction)

The nonvolatile fraction is determined according to ASTM D2369 (date: 2015). In this procedure, 2 g of sample are weighed out into an aluminum dish which has been dried beforehand, and the sample is dried in a drying cabinet at 110° C. for 60 minutes, cooled in a desiccator, and then reweighed. The residue, relative to the total amount of sample introduced, corresponds to the nonvolatile fraction.

2. Determination of Demolding Energy

In this case an adhesive strip (TESA 4651; see Tesa datasheet) with dimensions of 2.5×4 cm is bonded to the upper side of a molding tool. Beforehand at one end the adhesive tape is folded over once to give a loop, through which a hole is drilled. The spring balance is suspended in this hole. Using a scalpel, the coating film is cut through around the adhesive tape, to give a defined area of 10 cm². The removal direction is orthogonal to the molding tool.

3. Capacity for Further Processing

The respective release agent composition was applied to a molding tool surface at 55° C. Directly after the end of application, a fingertip was used to dab the liquid release agent composition in a 5-second cycle, as far as possible uniformly/with constant pressure. The respective release agent composition had capacity for further processing as soon as it had fully dried but could not be detached from the molding tool.

4. Determination of Acid Number

The acid number is determined according to DIN EN ISO 2114 (date: June 2002), using "method A". The acid number corresponds to the mass of potassium hydroxide in mg required to neutralize 1 g of sample under the conditions specified in DIN EN ISO 2114. The acid number reported corresponds here to the total acid number as specified in the DIN standard, and is based on the solids content.

5. Determination of OH Number

The OH number is determined according to DIN 53240-2. The OH groups are reacted by acetylation with an excess of acetic anhydride. The excess acetic anhydride is subsequently split by addition of water to form acetic acid, and the entire acetic acid is back-titrated with ethanolic KOH. The OH number indicates the quantity of KOH in mg that is equivalent to the amount of acetic acid bound in the acetylation of 1 g of sample. The OH number is based on the solids content of the sample.

6. Determination of Number-Average and Weight-Average Molecular Weight

The number-average molecular weight ($M_n$) is determined by gel permeation chromatography (GPC) according to DIN 55672-1 (March 2016). Besides the number-average molecular weight, this method can also be used to determine the weight-average molecular weight ($M_w$) and also the polydispersity d (the ratio of weight-average molecular weight ($M_w$) to number-average molecular weight ($M_n$)). Tetrahydrofuran is used as the eluent. The determination is made against polystyrene standards. The column material consists of styrene-divinylbenzene copolymers.

Working Examples

The inventive and comparative examples hereinafter serve to elucidate the invention, but should not be interpreted as imposing any limitation.

With regard to the stated formulation constituents and their quantities, the following should be borne in mind: any reference to a commercial product is to exactly that commercial product, irrespective of the particular principal name selected for the constituent.

1. Release Agent Compositions Used

The release agent compositions Z1 to Z6 are each obtained by homogeneous mixing of the constituents reported in table 1.

TABLE 1

Release agent compositions used

|  | Z1 | Z2* | Z3 | Z4* | Z5* | Z6* |
|---|---|---|---|---|---|---|
| Parocryl 4085[1] | 108.9 | 201.5 | — | — | 50.38 | 201.5 |
| Desmophen 670 BA[2] | 108.9 | 201.5 | — | — | 352.62 | 201.5 |
| 1-Methoxy-2-propyl acetate | 201.1 | 213.0 | — | — | 213.0 | 213.0 |
| Additive MI-8010[3] | — | 23.5 | — | 22.3 | 23.5 | 23.5 |
| Borchi Gol OL17[4] | — | 9.50 | — | 9.02 | 9.50 | 9.50 |
| Silmer OHT Di-10[5] | — | 4.50 | — | 4.27 | 4.50 | 4.50 |
| Tinuvin 1130[6] | 2.43 | 4.50 | — | — | 4.50 | 4.50 |
| Butyl acetate | 15.7 | 29.0 | — | — | 29.0 | 29.0 |
| K-Kat XK-651[7] | 7.03 | 7.03 | — | — | 7.03 | 7.03 |
| Desmodur N 3800[8] | 154.0 | 154.0 | — | — | 154.0 | 154.0 |
| Permutex RP-39-525[9] | — | — | 763.2 | 727.6 | — | — |
| Permutex XR-5577[10] | — | — | 84.8 | 84.8 | — | — |
| Color base BF[11] | — | — | — | — | — | 169.6 |

*used in the process of the invention

[1] hydroxyl-functional poly(meth)acrylate having a hydroxyl number of 82.5 mg KOH/g, an acid number of 10 mg KOH/g, $M_n$ about 6800 g/mol, $M_w$ about 17 000 g/mol (BASF SE),

[2] polyester polyol having a hydroxyl number of 115 mg KOH/g and a hydroxyl functionality of about 3.5 (Covestro),

[3] mixture of compounds of the formula $R^1$—(C=O)$_r$—O-(AO)$_s$—$R^2$, composed of (a) $R^1$=mixture of saturated and unsaturated hydrocarbon radicals having 12 to 22 carbon atoms, r=0, AO=mixture of primarily ethylene oxide units and a few propylene oxide units, and $R^2$=H ($M_n$≈650 g/mol); and (b) $R^1$=unsaturated hydrocarbon radical having 21 carbon atoms, s=0, and $R^2$=H (Munch Chemie International GmbH),

[4] polyether-modified methylpolysiloxane (Borchers GmbH),

[5] hydroxy-modified polysiloxane of the formula (III) with the above-recited radicals (Siltec GmbH & Co. KG),

[6] UV absorber (BASF Corporation),

[7] bismuth neodecanoate (King Industries),

[8] hexamethylene diisocyanate trimer of isocyanurate type with an NCO content of 11.0 wt % (Covestro),

[9] aqueous polyurethane dispersion (from Stahl Holdings B.V.),

[10] aqueous dispersion of a polycarbodiimide (from Stahl Holdings B.V.),

[11] color base BF is selected from 55-M 1 1 L Effect Additive, 55-A 098 0.5 L stone white, 55-M 141 0.5 L yellow, 55-M 306 1 L rust red, 55-A 556 1 L ocean blue 2, 55-A 640 1 L blue-green, 55-A 974 1 L tinting black, 55-M 99-21 1.0 L crystal silver coarse, 55-M 800 1 L pearl red-brown.

2. Determination of Adhesive Force of the Release Agent Composition on the Surface of a Molding Tool The adhesive force is determined as described above. The results are reproduced in table 2.

TABLE 2

Adhesive force of the release agent compositions on a molding tool

|  | Adhesive force [N] |
|---|---|
| Z1 | 5** |
| Aqueous release agent WT[1] + Z1 | 1.6 |
| Z2* | 0.5 |
| Aqueous release agent WT[1] + Z2 | 0.15 |
| Z3 | 4.9 |
| Aqueous release agent WT[1] + Z3 | 0.9 |
| Z4* | 0.6 |
| Aqueous release agent WT[1] + Z4 | 0.1 |

*used in the process of the invention
**delamination
[1] Acmosil 36-5645-19 (emulsion of polysiloxanes and other active ingredients in water)

Composition Z1, not used inventively, could not be separated from the molding tool, since the adhesive tape underwent delamination at 5 newtons. If additionally, prior to the application of the composition Z1, an external release agent (aqueous release agent WT) was applied, there was a marked improvement in the releaseability. The inventively used compositions Z2 and Z4 exhibit high demoldability even without the use of an additional, external release agent, the demoldability achieved in fact being better than on combination of the compositions Z1 and Z3 with the external release agent (WT). The demoldability of the inventively used compositions Z2 and Z4 can be improved further through the use of an additional, external release agent (aqueous release agent WT). Furthermore, the addition of the at least one color base BF does not lead to an increase in the adhesive force, and so the ready demoldability of the composition is not adversely affected by the pigmentation (cf. compositions Z2 and Z6).

3. Determination of Further-Processing Time

The further-processing time is determined as described above. The results are reproduced in table 3.

TABLE 3

Further-processing time of release agent compositions

|  | Further-processing time [s] |
|---|---|
| Z1 | 30 |
| Z2* | 25 |
| Z3 | 85 |
| Z4* | 30 |

*used in the process of the invention

In table 3 it is apparent that the inventively used compositions Z2 and Z4 have a lower flashing time than the noninventive compositions Z1 and Z3. Moreover, adding the color base BF has no adverse effect on the flashing time (cf. compositions Z2 and Z6). These short flashing times permit short operating times for process step (B) and hence an efficient process regime.

4. Production and Testing of Coated Components 4.1 Production of Coated Components Coated foam footwear soles are produced by the rotary table process. In this process, in a first cycle, the release agent compositions Z1, Z2, and Z4 to Z6 are each manually applied pneumatically (SATA Jet 4000 B HVLP with nozzle 1.0) to the surface of a respective molding tool (the mold consists of an aluminum alloy and has two mold side parts, a core plate, and a plate which closes off the hollow mold compartment at the top). The molding temperature was 55° C. or 65° C. (process step (A)). In a second cycle, the release agent layers are flashed (flashing time: 20 to 25 s; dry film thickness: about 80 μm (by light microscopy)) (process step (B)). In the next cycle, the two mold side parts are closed, and a TPU outsole is inserted and activated by IR (process step (C)). In a further cycle, the molding parts are closed completely and a polyester-based polyurethane foam system is injected (process step (D)). This system is obtainable by mixing an A component (containing 100 wt % of polyol mixture 270/40[1]) and also 10.6 wt % of Elastopan S 7429/155 catalyst[2]) with a B component (containing Iso 187/68[3]) in a ratio of 100:84. The foam density is 280 to 320 kg/m$^3$. In the case of composition Z2, both an unpigmented foam system and a foam system with blue pigmentation were used.

[1] Polyester polyol mixture having an OH number of 51 mg KOH/g (BASF Italia S.p.A.)
[2] Isocyanate based on 4,4'-diphenylmethane diisocyanate, with an NCO content of 18.7% (BASF Italia S.p.A.)
[3] Mixture of aliphatic tertiary amines, glycols, and stabilizers, having a water content of 3.9 wt % (BASF Italia S.p.A.)

The curing of the layer of coating material and also the formation of the polyurethane foam take place over a period of 3.5 minutes in the closed mold at 55° C. or 65° C. (process step (D)).

After the 3.5-minute cure time has elapsed, the coated foam material is automatically removed from the opened molding tool (process steps (F) and (G)). For all of the release agent compositions used, demolding is achieved easily and completely without assistants. However, only the surface of the components produced using the compositions Z2, Z4, Z5 and Z6 (inventive) meets the mattness required in the footwear industry. The surface of the components produced using the composition Z1 (not inventive) is very shiny.

4.2 Ross Flex Test

Using the components produced above, the Ross flex test according to ASTM D1052:2009 was carried out, with a flex angle of 60°. The test was carried out in each case over 100 000 cycles, with the components being inspected after 50 000 cycles and then after each further 10 000 cycles for the presence of damage to the surface of the coating.

Even after 100 000 cycles, the components coated by the process of the invention did not show any surface damage. Accordingly, the coatings achieved by this process not only lead to outstanding demoldability of the components after their production, but also exhibit high adhesion to the components and high flexibility. The coating, therefore, is also extremely robust and therefore does not lead to stress whitening, of the kind occurring in the vacuum foil process.

4.3 Rub Fastness

The rub fastness of the component produced using the release agent composition Z6 was tested on the basis of DIN EN ISO 11640:2017-05. For this purpose, the respective component was clamped into an SDL Atlas Crockmeter. A commercial abrasive paper of grade P280 was used to rub the lacquered side of the component, with a pressing force of 9 N, for 25 back-and-forth strokes, with a stroke length of 5 cm. The colored residue on the abrasive paper and also the surface of the coating were then inspected. While the abrasive paper did have small residues of the coating, there was no visible damage to the coating. The process of the invention, accordingly, leads to coatings which exhibit good rub fastness.

4.4 Migration Fastness

To investigate the migration behavior of the pigments under pressure, the 1-NOVO lacquer system was investigated in accordance with DIN EN ISO 15701:2015-07. In this case, the lacquered side of the component coated with the release agent composition Z6 was covered with a PVC film (to EN ISO 15701) from James Heal. The component and the PVC film were clamped between two glass plates in a James Heal Perspirometer and weighted with a weight of 4.5 kg. The Perspirometer was subsequently stored at 50° C. for 16 hours. At the end of the storage time, the experimental set-up was dismantled again and the PVC film was inspected for discoloration. With the component tested, there was no discoloration of the PVC film. The migration fastness of the coated components is therefore high.

4.5 Accuracy of Hue, Intensity of Hue

The accuracy and the intensity of hue of a component B1 (coated with pigmented release agent composition Z6, unpigmented foam system) was assessed visually with the intensity of hue of a component B2 (coated with unpigmented release agent composition Z2, blue-pigmented foam system). The results obtained were as follows (rating 1: accuracy of hue comparable with OEM vehicle finishing, viz. very high hue intensity, rating 2: accuracy of hue poorer than for OEM vehicle finishing, viz. high hue intensity, rating 3: accuracy of hue significantly poorer than for OEM vehicle finishing, viz. low intensity of hue).

| Component | Accuracy of hue | Intensity of hue |
| --- | --- | --- |
| B1 | 3 | 3 |
| B2 | 1 | 1 |

As is evident from the table above, the coating of components by the process of the invention with pigmented release agent compositions (component B1) leads to greater accuracy of hue and intensity of hue than the pigmentation of the foam material (component B2).

4.6 Compatibility

To determine the compatibility of the coating material compositions with foam compositions used in the production of components, components were produced as described under 4.1. The components were produced using release agent composition Z2, a wax-based release agent (Munch Chemie), and a silicone-based release agent (Munch Chemie). The compatibility of the release agent with the foam system used to produce the component was assessed visually, with incompatibility being manifested by bulges and indentations in the foam. The results obtained were as follows (rating 1: very good compatibility, rating 2: good compatibility, rating 3: satisfactory compatibility, rating 4: adequate compatibility).

TABLE 4

| Compatibility of the release agent compositions | | |
| --- | --- | --- |
| Component | Release agent composition | Compatibility |
| B1* | Z2 | 1 |
| B2 | wax-based release agent | 3 |
| B3 | silicone-based release agent | 4 |

*obtainable by inventive process

From table 4 it is apparent that the release agent composition Z2 used in the inventive process exhibits very good compatibility with the foam system used for producing the components. The inventively produced component (B1) has no bulges or indentations. In contrast, noninventively produced components (B2, B3) have bulges and indentations, owing to the merely satisfactory or adequate compatibility between release agent and foam system.

4.7 Effect of the release agent composition on the flow properties of the composition used for producing components To determine the effect of the release agent compositions on the foam compositions used for producing components, components were produced as described under 4.1. The components were produced using the release agent composition Z2 (inventive component B1) and also an aqueous release agent (MP6032-5, Munch Chemie) (noninventive component B2). The core plate used was a core plate with simple geometry, a core plate with more complex geometry, in footwear sole form, and a core plate with angled geometry, including struts just a few millimeters wide. The demolding and the filling of the core plate by the foam system were each assessed visually. The results obtained were as follows (rating 1: very good demolding or very high improvement in the flow properties, rating 2: good demolding or high improvement in the flow properties, rating 3: satisfactory demolding or minimal defects in the component, rating 4: adequate demolding or high number of defects in the component).

TABLE 5

Effect of the release agent compositions on the flow properties of the foam system

| Core plate form | Component | Demoldability | Effect on flow properties |
|---|---|---|---|
| Simple plate geometry | B1* | 1 | 1 |
| | B2 | 1 | 1 |
| Footwear sole | B1* | 1-2 | 1 |
| | B2 | 2-3 | 2 |
| Angled geometry | B1* | 2 | 1 |
| | B2 | 3-4 | 3 |

*obtainable by inventive process

From table 5 it is apparent that with the process of the invention, outstanding demoldability is achieved even when using molding tools of highly complex geometry. With the process of the invention, moreover, the flow property of the foam system is improved, and so even narrow cavities in the core plate of the molding tool can be fully filled with the foam composition. This allows the defect-free production of components of complex geometry. Conversely, a noninventive process in the case of more complex molding tools leads to poorer demoldability. With this process, moreover, especially in the case of complex molding-tool core plates, defects arise due to the lack of filling of cavities.

The invention claimed is:

1. An automatic process for injection molding of coated components, comprising the following steps in the order indicated:
  (A) applying a release agent composition to at least one inside of at least one molding part of a closable molding tool,
  (B) flashing the release agent composition applied in step (A),
  (C) optionally inserting a first material M1, closing the molding tool, and heating the molding tool,
  (D) injecting a composition Z1 into the closed molding tool and curing the composition Z1,
  (E) optionally injecting at least one further composition Z2 into the closed molding tool and curing the composition(s),
  (F) opening the molding tool,
  (G) removing a molded component from the opened molding tool, and
  (H) optionally aftertreating the molded component, wherein the release agent composition comprises:
  (a) at least one solvent L,
  (b) at least one compound of the general formula (I)

in which $R^1$ is a saturated or unsaturated, aliphatic hydrocarbon radical having 6 to 30 carbon atoms,
  $R^2$ is H, a $PO(OH)_2$ radical, or the optionally partially phosphated radical of a monosaccharide or disaccharide, or the optionally partially phosphated radical of an alditol,
  AO stands for one or more alkylene oxide radicals selected from the group consisting of ethylene oxide, propylene oxide and butylene oxide,
  r is 0 or 1, and s is 0 to 30;
  (c) optionally at least one polyether-modified alkylpolysiloxane,
  (d) at least one polysiloxane of the general formula (II)

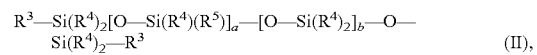

in which
  $R^3$ and $R^4$, in each case independently of one another, are a methyl group or a $(HO-CH_2)_2-C(CH_2-CH_3)-CH_2-O-(CH_2)_3-$* radical,
  $R^5$ is a methyl group,
  a is 0 or 1 to 10, and
  b is 3 to 30; and
  (e) optionally at least one color base BF.

2. The process as claimed in claim 1, wherein the release agent composition has a viscosity of 10 to 60 s.

3. The process as claimed in claim 1, wherein, in the general formula (I), $R^1$ is a saturated or unsaturated aliphatic hydrocarbon radical having 10 to 24 carbon atoms, $R^2$ is H, a $PO(OH)_2$ radical, or the optionally partially phosphated radical of a monosaccharide or disaccharide, or the optionally partially phosphated radical of an alditol, AO stands for one or more alkylene oxide radicals selected from the group consisting of ethylene oxide and propylene oxide, r is 0 or 1, and s is 0 or 1 to 25.

4. The process as claimed in claim 1, wherein the release agent composition comprises the at least one compound of the general formula (I) in a total amount of 0.1 to 10 wt %, based on the total weight of the release agent composition.

5. The process as claimed in claim 1, wherein the polyether-modified alkylpolysiloxane comprises at least one structural unit $(R^7)_2(OR^6)SiO_{1/2}$ and at least one structural unit $(R^7)_2SiO_{2/2}$, wherein $R^6$ is an ethylene oxide, propylene oxide, and butylene oxide group, and $R^7$ is a $C_1$-$C_{10}$ alkyl group.

6. The process as claimed in claim 1, characterized in that the release agent composition comprises the at least one polyether-modified alkylpolysiloxane in a total amount of 0 wt % or of 0.1 to 6 wt %, based on the total weight of the release agent composition.

7. The process as claimed in claim 1, wherein, in the general formula (II), the radical $R^3$ is a $(HO-CH_2)_2-C(CH_2-CH_3)-CH_2-O-(CH_2)_3-$* radical, the radical $R^4$ is a methyl group, the radical $R^5$ is a methyl group, a is 0, and b is 7 to 14.

8. The process as claimed in claim 1, wherein the release agent composition comprises the at least one polysiloxane of the general formula (II) in a total amount of 0.1 to 5 wt %, based on the total weight of the release agent composition.

9. The process as claimed in claim 1, wherein the release agent composition additionally comprises at least one binder B.

10. The process as claimed in claim 9, wherein the binder B is selected from the group consisting of (i) poly(meth)acrylates, (ii) polyurethanes, (iii) polyesters, (iv) polyethers, (v) copolymers in the stated polymers, and (vi) mixtures thereof.

11. The process as claimed in claim 1, wherein the release agent composition is flashed in process step (B) for a period of 20 seconds to 120 minutes.

12. The process as claimed in claim 1, wherein the composition Z1 applied in process step (D) is a polymer foam.

13. The process as claimed in claim 1, wherein the curing in process step (D) takes place for a period of 3 to 20 minutes.

14. The process as claimed in claim 1, wherein the process comprises a further process step (I) in which the molding tool, after the removal of the coated component in process step (G), is cleaned.

15. The process as claimed in claim 14, wherein the further process step (I) is carried out after 20 to 100 repetitions of process steps (A) to (G).

16. The process as claimed in claim 1, wherein the release agent composition comprises the at least one compound of the general formula (I) in a total amount of 0.5 to 5 wt %, based on the total weight of the release agent composition.

17. The process as claimed in claim 1, wherein the polyether-modified alkylpolysiloxane comprises at least one structural unit $(R^7)_2(OR_6)SiO_{1/2}$ and at least one structural unit $(R^7)_2SiO_{2/2}$, wherein $R^6$ is a mixture of ethylene oxide and propylene oxide and butylene oxide groups, and $R^7$ is a methyl group.

18. The process as claimed in claim 1, characterized in that the release agent composition comprises the at least one polyether-modified alkylpolysiloxane in a total amount of 0.5 to 4 wt %, based on the total weight of the release agent composition.

19. The process as claimed in claim 1, wherein the release agent composition comprises the at least one polysiloxane of the general formula (II) in a total amount of 0.5 to 4 wt %, based on the total weight of the release agent composition.

20. The process as claimed in claim 9, wherein the binder B is selected from the group consisting of (i) hydroxy-functional and/or carboxylate-functional and/or amine-functional poly(meth)acrylates, (ii) hydroxy-functional and/or carboxylate-functional and/or amine-functional polyurethanes, (iii) polyester polyols, (iv) polyether polyols, (v) copolymers in the stated polymers, and (vi) mixtures thereof.

* * * * *